US011132840B2

(12) United States Patent
Sarangdhar et al.

(10) Patent No.: US 11,132,840 B2
(45) Date of Patent: Sep. 28, 2021

(54) METHOD AND DEVICE FOR OBTAINING REAL TIME STATUS AND CONTROLLING OF TRANSMITTING DEVICES

(71) Applicant: Samsung Electronics Co., Ltd., Gyeonggi-do (KR)

(72) Inventors: Aniket Mohan Sarangdhar, Noida UP (IN); Arun Kumar, Noida UP (IN)

(73) Assignee: Samsung Electronics Co., Ltd

( * ) Notice: Subject to any disclaimer, the term of this patent is extended or adjusted under 35 U.S.C. 154(b) by 41 days.

(21) Appl. No.: 15/870,361

(22) Filed: Jan. 12, 2018

(65) Prior Publication Data

US 2018/0204385 A1    Jul. 19, 2018

(30) Foreign Application Priority Data

Jan. 16, 2017 (IN) .............................. 201711001610

(51) Int. Cl.
| | |
|---|---|
| *G06F 3/0484* | (2013.01) |
| *G06T 19/00* | (2011.01) |
| *H04L 29/08* | (2006.01) |
| *G06F 3/01* | (2006.01) |
| *H04L 12/28* | (2006.01) |
| *G08C 17/02* | (2006.01) |
| *H04W 4/70* | (2018.01) |

(52) U.S. Cl.
CPC ............ *G06T 19/006* (2013.01); *G06F 3/011* (2013.01); *G06F 3/016* (2013.01); *G06F 3/0484* (2013.01); *G06T 19/003* (2013.01); *G08C 17/02* (2013.01); *H04L 12/2803* (2013.01); *H04L 67/125* (2013.01); *H04L 67/18* (2013.01); *G06T 2200/24* (2013.01); *G08C 2201/30* (2013.01); *G08C 2201/50* (2013.01); *H04W 4/70* (2018.02)

(58) Field of Classification Search
CPC ..... G06T 19/006; G06T 19/003; G06F 3/011; G06F 3/0484; H04L 67/125
USPC .......................................... 345/633
See application file for complete search history.

(56) References Cited

U.S. PATENT DOCUMENTS

| | | | |
|---|---|---|---|
| 9,077,865 | B1 | 7/2015 | Molyneux |
| 9,462,262 | B1 * | 10/2016 | Worley, III ............ G09G 5/003 |
| 2002/0044104 | A1 | 4/2002 | Friedrich et al. |
| 2004/0046711 | A1 | 3/2004 | Triebfuerst |

(Continued)

FOREIGN PATENT DOCUMENTS

| | | |
|---|---|---|
| WO | WO 2015 052480 | 4/2015 |
| WO | WO 2015 163913 | 10/2015 |

OTHER PUBLICATIONS

International Search Report dated Apr. 18, 2018 issued in counterpart application No. PCT/KR2018/000699, 9 pages.

*Primary Examiner* — Jin Ge
(74) *Attorney, Agent, or Firm* — The Farrell Law Firm, P.C.

(57) ABSTRACT

A method and a device for controlling at least one device in a wireless communication system are provided. The method includes rendering a digital representation of a real world environment on a display unit, wherein the digital representation includes a graphical representation of the at least one device based on a status information of the at least one device; receiving a user-input indicating control information of the at least one device; and controlling one or more operations of the at least one device in the real world environment based on the control information.

20 Claims, 28 Drawing Sheets

(56) References Cited

U.S. PATENT DOCUMENTS

| | | | |
|---|---|---|---|
| 2006/0241792 A1* | 10/2006 | Pretlove | G06F 3/011 |
| | | | 700/83 |
| 2010/0070902 A1* | 3/2010 | De Los Reyes | G06F 3/023 |
| | | | 715/771 |
| 2010/0317332 A1* | 12/2010 | Bathiche | H04B 1/202 |
| | | | 455/418 |
| 2011/0029903 A1 | 2/2011 | Schooleman et al. | |
| 2011/0279639 A1 | 11/2011 | Anand et al. | |
| 2012/0065814 A1* | 3/2012 | Seok | B60K 35/00 |
| | | | 701/2 |
| 2013/0155307 A1 | 6/2013 | Bilbrey et al. | |
| 2013/0170710 A1* | 7/2013 | Kuoch | G06K 9/00624 |
| | | | 382/104 |
| 2013/0207963 A1 | 8/2013 | Stirbu et al. | |
| 2014/0096084 A1* | 4/2014 | Kwon | G06F 3/0482 |
| | | | 715/835 |
| 2014/0152698 A1 | 6/2014 | Kim et al. | |
| 2014/0257525 A1* | 9/2014 | Nagamatsu | G05B 15/02 |
| | | | 700/28 |
| 2015/0193977 A1* | 7/2015 | Johnson | G06T 19/006 |
| | | | 345/419 |
| 2015/0202962 A1* | 7/2015 | Habashima | B60K 35/00 |
| | | | 345/633 |
| 2016/0071319 A1* | 3/2016 | Fallon | G06T 19/006 |
| | | | 345/633 |
| 2016/0077711 A1 | 3/2016 | Jung et al. | |
| 2016/0140868 A1 | 5/2016 | Lovett et al. | |
| 2016/0148417 A1* | 5/2016 | Kim | G05D 1/0044 |
| | | | 345/419 |
| 2016/0209658 A1 | 7/2016 | Zalewski | |
| 2016/0217623 A1 | 7/2016 | Singh | |
| 2016/0274762 A1* | 9/2016 | Lopez | G06T 19/006 |
| 2016/0313902 A1* | 10/2016 | Hill | G06F 3/04847 |
| 2017/0092084 A1* | 3/2017 | Rihn | G08B 6/00 |
| 2017/0108838 A1* | 4/2017 | Todeschini | G05B 15/02 |
| 2017/0249745 A1* | 8/2017 | Fiala | G06K 9/00671 |

\* cited by examiner

METHOD AND DEVICE FOR OBTAINING REAL TIME STATUS AND CONTROLLING OF TRANSMITTING DEVICES

PRIORITY

This application claims priority under 35 U.S.C. § 119(a) to an Indian Patent Application filed on Jan. 16, 2017 in the Indian Patent Office and assigned Serial No. 201711001610, the entire disclosure of which is incorporated herein by reference.

BACKGROUND

1. Field of the Disclosure

The present disclosure relates generally to Internet of Things (IoT) devices and virtual reality (VR), and more particularly, to obtaining real time status and controlling of IoT devices via VR.

2. Description of the Related Art

IoT refers to the interconnection of uniquely identifiable devices using a network. Devices, popularly referred to as IoT devices or as smart devices, are embedded with electronics, software, sensors, actuators, and network connectivity that enable these devices to collect data, exchange data and be controlled over a network. Such devices include, but are not limited to, sensors, smart automation devices, wearable devices, and a smart phone.

Currently, a user may track and manage IoT devices in a home environment using a smart phone. However, the number of IoT devices that may be tracked and managed is small, for example 10 devices. For example, FIGS. 1A, 1B, and 1C illustrate an electronic device such as a smart phone 100 for tracking and managing IoT devices in a home environment.

Referring to FIG. 1A, the smart phone 100 displays a list 101 of home environments such as a kitchen, a master bedroom, a garage, a living room, a kid's room, and a laundry room, having IoT devices (hereinafter interchangeably referred to as smart devices) connected with the smart phone 100. The user must select an environment from the list 101, for viewing the IoT devices present in the selected environment. The user selects the "Master Bed Room" environment (as indicated by a dashed rectangle).

Referring to FIG. 1B, the smart phone 100 then displays a list 102 of smart devices available in the selected "Master Bed Room" environment. The list 102 of smart devices only displays an operating status as ON and OFF. To view further details about any smart device, the user must select the device from the list 102 of smart devices. Further, if there are many devices, then the user must scroll through the list 102 and select a device. This process is manual, tedious, and time consuming.

In FIG. 1B, the "Coffee Maker" device is selected.

Referring to FIG. 1C, the smart phone 100 then displays details 103 of the selected Coffee Maker device. However, the details 103 are limited to a name and an internet protocol (IP) address of the device. The details 103 of the device fail to provide any real time information related to the device such as real time positioning, real time orientation, and network connectivity.

Further, with advancement in technology, augmented reality (AR) and VR technologies are gaining popularity. AR technologies modify a digital view of a real world environment by superimposing virtual objects on the digital view in real time. Examples of AR include AR 3D viewers, AR browsers, and AR games. VR technologies refer to the generation of a three-dimensional image or video of a real world environment with which a user may interact using a VR device. In one embodiment, a VR device may have VR processing and VR rendering capabilities.

In FIGS. 2A and 2B, a user (201) may wear a VR device 202 to enjoy a VR experience, wherein the VR device 202 includes a smart phone 203 mounted in a secure manner in a mounting unit 205 provided in a head mounted device (HMD) 204, wherein the smart phone 203 faces lenses of the HMD 204, wherein, the VR device 202 allows more degrees of freedom for managing IoT devices. However, the user interaction on a mobile device is limited to the touch screen area.

Additional Benefits of using VR Device includes the VR environment being similar to the real world in order to artificially create a lifelike sensory experience, which may include sight, touch, hearing, and smell senses.

Navigating in a VR environment to check IoT devices would be a real lifelike experience without physically visiting those real places.

In a VR environment a user may switch from one location to any remote location.

While the general art proposes viewing information related to smart devices in real time by use of VR along with AR, general solutions require many cameras to be placed at various geographical locations to view live streaming. Further, a camera may only capture information related to external features of any device, such as size, shape, color, etc. In particular, general solutions cannot capture and provide live updates about information related to IoT devices such as internal functioning, connectivity status, and power consumption. In addition, general solutions consume much power and network bandwidth due to real time processing of live feed/streaming from cameras for generating VR/AR views. Some general solutions necessitate the creation of virtual counterparts of real world IoT devices in a VR environment.

Thus, there exists a need for a solution to overcome the above-mentioned deficiencies and enable tracking and management of IoT devices in a home environment in a user-friendly manner. Apart from the above, it is desirable that a solution minimizes factors such as overhead, power consumption and network bandwidth consumption.

SUMMARY

An aspect of the present disclosure provides an IoT device for obtaining real time status and controlling transmitting devices (e.g., IoT devices) in the real world via VR.

In accordance with an aspect of the present disclosure, a method for controlling at least one device in a wireless communication system is provided. The method includes rendering a digital representation of a real world environment on a display unit, wherein the digital representation includes a graphical representation of the at least one device based on a status information of the at least one device; receiving a user-input indicating control information of the at least one device; and controlling one or more operations of the at least one device in the real world environment based on the control information.

In accordance with another aspect of the present disclosure, a device for controlling at least one device in a wireless communication system is provided. The device includes a user interface unit configured to receive a user-input indicating control information of the at least one device; and at least one processor configured to render the digital representation of the real world environment on a display unit, the digital representation including a graphical representation of the at least one device based on a status information of the at least one device, and control one or more operations of the at least one device in the real world environment based on the control information.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figures 1A, 1B, 1C:
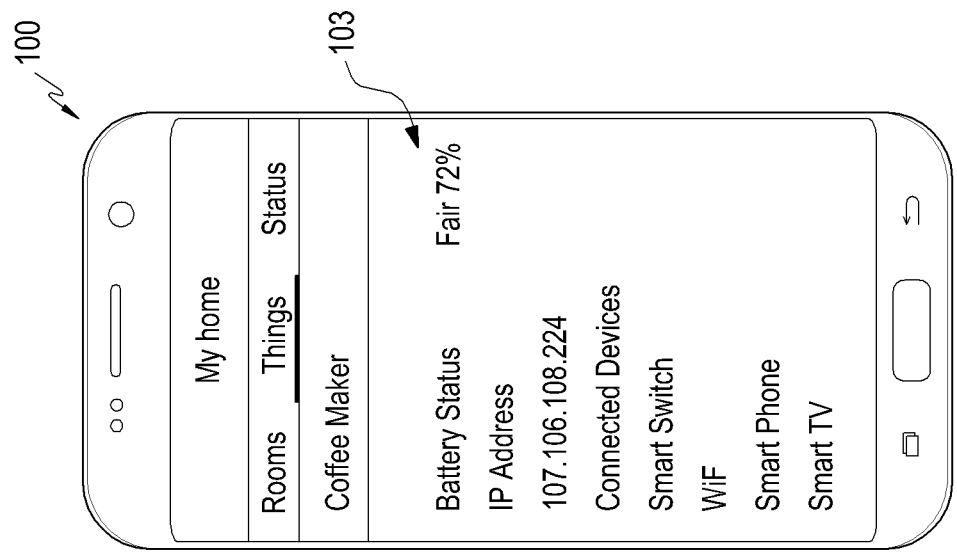
FIGS. 1A, 1B, and 1C illustrate an electronic device for tracking and managing IoT devices in a home environment.
Figure 2A:
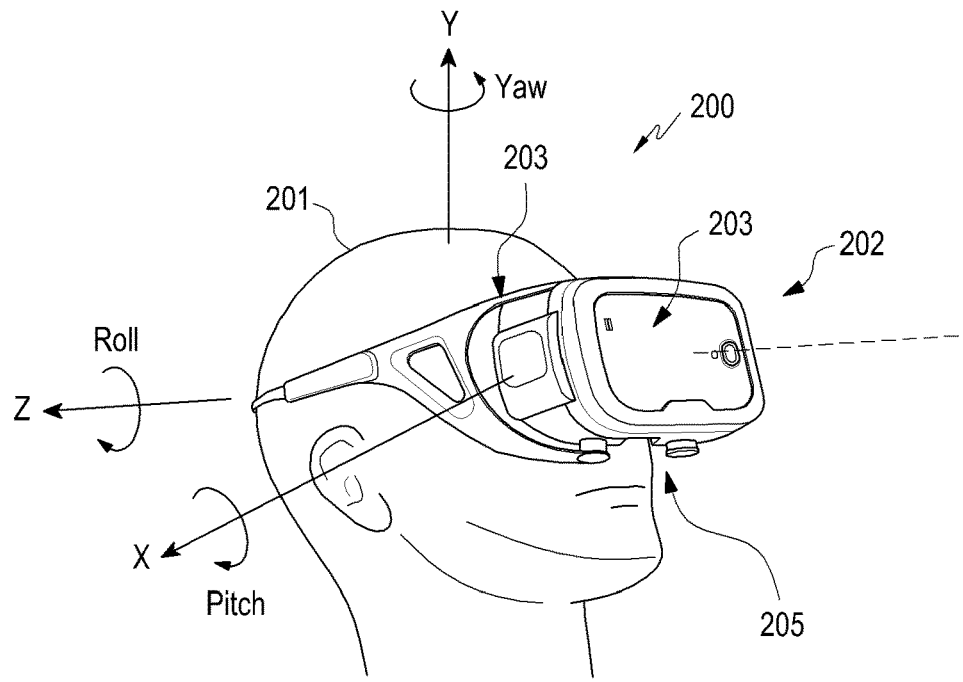
FIGS. 2A and 2B illustrate a user wearing a VR device including a smart phone mounted in an HMD.
Figure 2B:
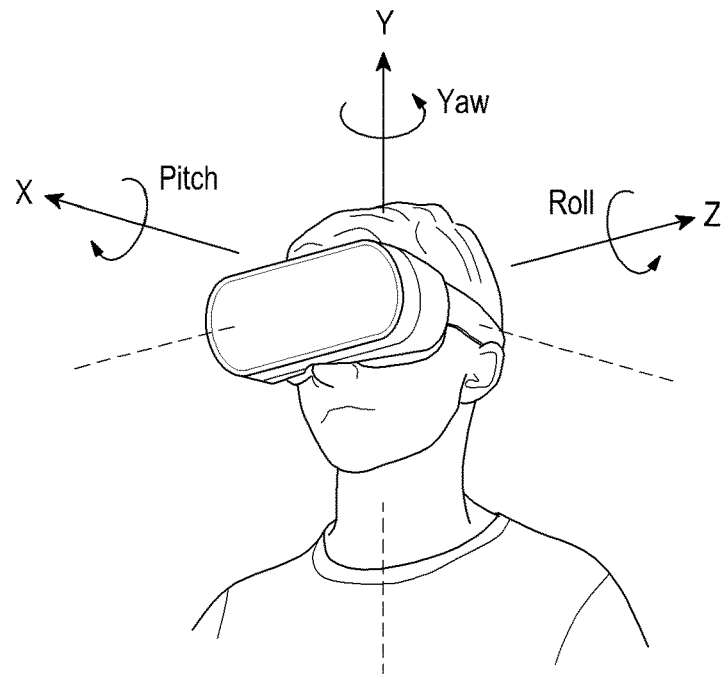

Although embodiments of the present disclosure are described below, the present disclosure may be implemented using any number of techniques. The present disclosure is not intended to be limited to the embodiments, accompanying drawings, and techniques described below, but may be modified within the scope of the present disclosure as defined by the appended claims and their equivalents.

The term "some" as used herein indicates none, one, more than one, and all. Accordingly, the terms "none," "one," "more than one," "more than one, but not all" and "all" are intended to be indicated by the term "some." The term "some embodiments" may refer to no embodiments, one embodiment, several embodiments, and all embodiments. Accordingly, the term "some embodiments" is is intended to indicate no embodiment, one embodiment, more than one embodiment, and all embodiments.

The terminology employed herein is for describing, teaching and illuminating some embodiments and their features and elements but is not intended to limit, restrict or reduce the scope of the present disclosure as defined by the appended claims and their equivalents.

Any terms used herein such as but not limited to "includes," "comprises," "has," "consists," and grammatical variants thereof are not intended to specify an exact limitation or restriction of the present disclosure and are not intended to exclude the possible addition of one or more features or elements, unless otherwise stated, and are not intended to exclude the possible removal of one or more of the listed features and elements, unless otherwise stated with the limiting language "must comprise" or "must include."

Whether or not a certain feature or element is limited to being used only once, the feature or element may be referred to as "one or more features," "one or more elements," "at least one feature," and "at least one element," respectively. Furthermore, the use of the terms "one or more" and "at least one" feature or element are not intended to preclude there being none of that feature or element, unless otherwise specified by limiting language such as "there must be one or more . . . " or "one or more element is required."

Unless otherwise defined, all terms used herein may be taken to have the same meaning as commonly understood by one having an ordinary skill in the art.

Reference is made herein to some "embodiments." It is intended that an embodiment is an example of a possible embodiment of any features and/or elements presented in the appended claims. Some embodiments are described for the purpose of illuminating one or more of the potential ways in which certain features and/or elements of the attached claims fulfil the requirements of uniqueness, utility and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" and variants thereof are not necessarily intended to refer to the same embodiments. Unless otherwise specified, one or more particular features and/or elements described in connection with one or more embodiments may be found in one embodiment, in more than one embodiment, in all embodiments, and in no embodiments. Although one or more features and/or elements may be described herein in the context of only a single embodiment, alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore are not intended to necessarily limit the present disclosure. The appended claims and their equivalents may be realized in the context of embodiments other than the ones described below.

In an embodiment of the present disclosure, a digital representation of the real world environment is obtained. The real world environment includes at least one transmitting device. The digital representation is indicative of a virtual realty environment corresponding to the real world environment. From the digital representation, the at least one transmitting device is identified and status information and/or location information of the at least one transmitting device is obtained. Thereafter, a modified digital representation is generated such that the modified digital representation includes a graphical representation of the at least one transmitting device in conjunction with the obtained status information and/or the obtained location information. The modified digital representation is then displayed or rendered on a VR enabled display unit. Thus, the modified digital representation indicates at position or location corresponding to the position or location of the transmitting device(s) at the real place along with real time status.

Further, the at least one transmitting device may be controlled via the digital representation. To this end, upon rendering the modified digital representation, a user-input indicative of control information of the at least one transmitting device is received through a VR enabled input unit. The control information is indicative of a variation in a value of location information and/or a device parameter of the at least one transmitting device. In accordance with the control information, one or more operations of the at least one transmitting device in the real world environment is controlled.

The advantages of the disclosure include, but are not limited to, viewing of the transmitting devices available in the real world environment via a VR space or digital representation. Further, real time status information and/or location information is provided on the digital representation. Furthermore, as the digital representation may be a virtual replica of the real world environment, navigating within the digital representation to interact with the transmitting devices provides a real lifelike experience. Further, the transmitting devices may be controlled through the digital representation via user-input received through a VR enabled input unit. For example, a user may interact with a transmitting device in a more natural and intuitive way. Furthermore, the user is not required to be physically present at the location to view the real time status information and/or location information or to operate the transmitting devices. Each of the above aspect contributes considerably to improving a user-experience.

Figure 3A:
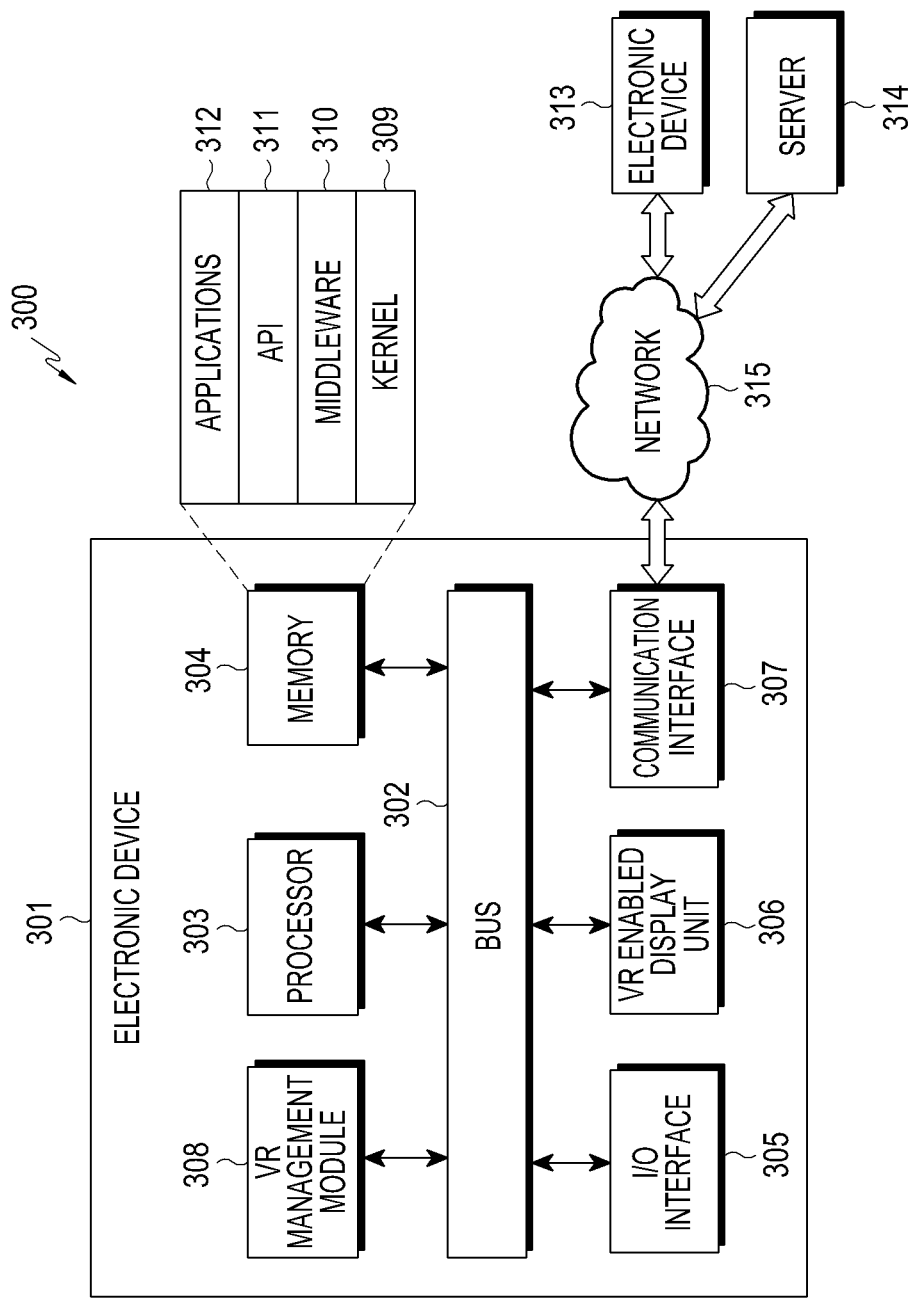
FIGS. 3A and 3B are block diagrams of a network environment that includes an electronic device, according to an embodiment of the present disclosure.
Figure 3B:
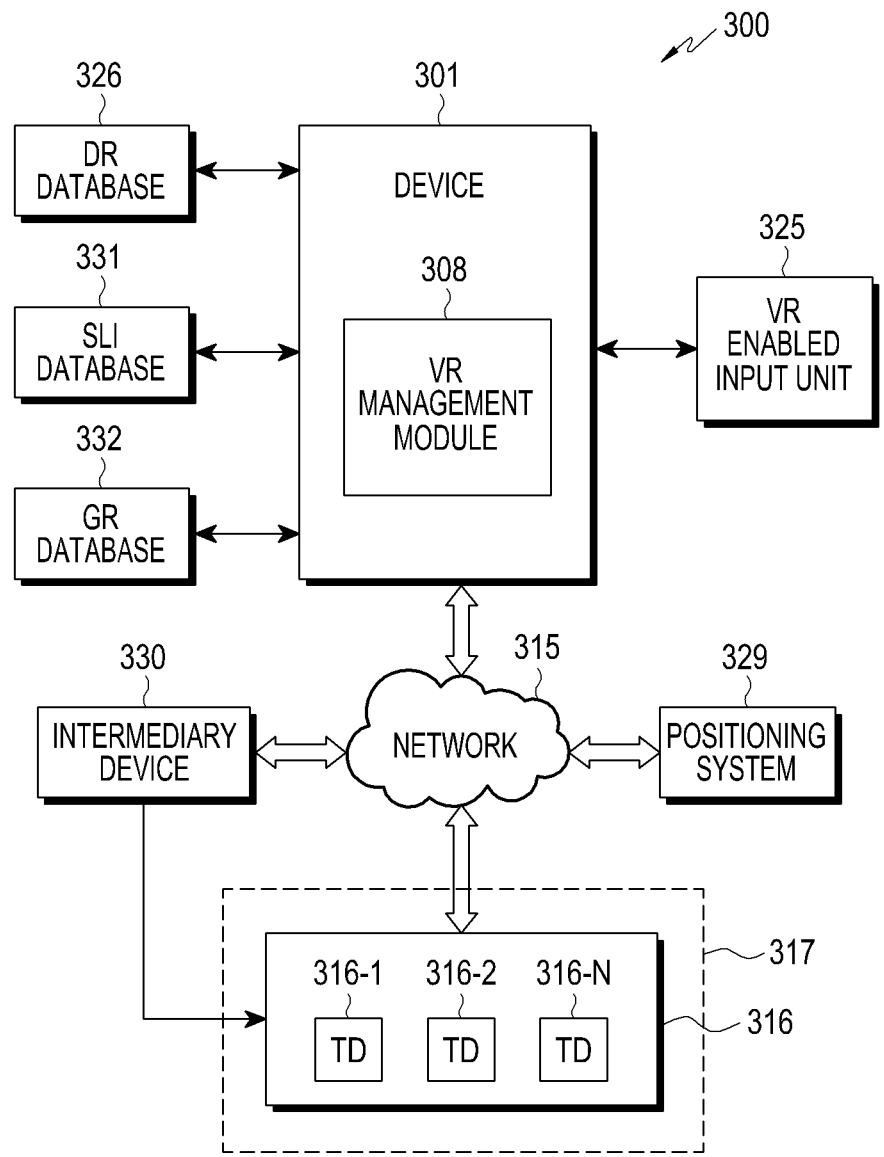

FIGS. 3A and 3B are block diagrams of a network environment 300 that includes an electronic device 301, according to an embodiment of the present disclosure.

Referring to FIG. 3A, the electronic device 301 may include a bus 302, a processor 303, a memory 304, an input/output (I/O) interface 305, a VR enabled display unit 306, a communication interface 307, and a VR management module 308 The bus 302 may be a circuit that connects the foregoing components and allows communication (for example, control messages) between the foregoing components.

The processor 303 may, for example, receive instructions from other components (for example, the memory 304, the I/O interface 305, the VR enabled display unit 306, and the communication interface 307), interpret the received instructions, and execute computation or data processing according to the interpreted instructions. The processor 303 may control one or more other components of the electronic device 301 and/or processes an operation or data related to communication. The processor 303 may include one or more of a central processing unit (CPU), an application processor (AP), and a communication processor (CP).

The memory 304 may, for example, store instructions or data that are received from, or generated by, other components (for example, the I/O interface 305, the VR enabled display unit 306, the communication interface 307, and the VR management module 308). For example, the memory 304 may include programming modules such as a kernel 309, a middleware 310, an application programming interface (API) 311, and applications 312. Each of the foregoing programming modules may include software, firmware, hardware, or a combination of at least two of software, firmware, and hardware.

The kernel 309 may control or manage system resources (for example, the bus 302, the processor 303, or the memory 304) that are used in executing operations or functions implemented in other programming modules such as the middleware 310, the API 311, and the applications 312. In addition, the kernel 309 may provide an interface for allowing the middleware 310, the API 311, or the applications 312 to access and control or manage individual components of the electronic device 301.

The middleware 310 may be a medium through which the kernel 309 may communicate with the API 311 or the applications 312 to transmit and receive data. In addition, the middleware 310 may perform control operations (for example, scheduling or load balancing) in regard to work requests by one or more applications 312 by, for example, assigning priorities for using system resources (e.g., the bus 302, the processor 303, and the memory 304) of the electronic device 301 to the one or more applications 312.

The API 311 is an interface that may control functions that the applications 312 provide at the kernel 309 or the middleware 310. For example, the API 311 may include at least one interface or function (for example, a command) for file control, window control, video processing, or text control.

According to an embodiment of the present disclosure, the applications 312 may include a short message service (SMS)/multimedia messaging service (MMS) application, an email application, a calendar application, an alarm application, a health care application (for example, an application that measures an amount of exercise or a blood sugar level), or an environmental information application (for example, an application that provides information about air pressure, humidity, and temperature). Alternatively or additionally, the applications 312 may be related to information exchange between the electronic device 301 and an external electronic device (for example, an electronic device 313). The information exchange-related application may be, for example, a notification relay application for transmitting certain information to the external electronic device or a device management application for managing the external electronic device.

For example, the notification relay application may include a function of transmitting notification information generated from another application (for example, an SMS/MMS application, an email application, a health care application, or an environment information application) to the external electronic device 313. Alternatively or additionally, the notification relay application may receive notification information from the external electronic device 313 and transmit the received notification information to a user. The device management application may manage (for example, install, delete, and update) at least a part of functions of the external electronic device 313 communicating with the electronic device 301 (for example, turn-on and turn-off of the external electronic device 313 (or a part of its components) or control of the brightness (or resolution) of the display), an application executed in the external electronic device, or a service (for example, a call service or a message service) provided by the external electronic device.

According to an embodiment of the present disclosure, the applications 312 may include an application designated according to a property (for example, the type of the electronic device) of the external electronic device (for example, the electronic device 313). For example, if the external electronic device is a digital audio player, the applications 312 may include an application related to music play. If the external electronic device is a mobile medical device, the applications 312 may include an application related to health care. According to an embodiment, the applications 312 may include at least one of an application designated in the electronic device 301 or an application received from a server 314 or the electronic device 313. The server 314 may be a single server or a group of more than one server.

Further, according to an embodiment of the present disclosure, an electronic device, or a plurality of electronic devices, such as the external electronic device 313 and the server 314, may perform some or all of the operations performed by the electronic device 301. For example, when the electronic device 301 performs some functions or services automatically or by request, the electronic device 301 may request the external electronic device 313 and the server 314 to perform at least some of the functions related to the functions or services, in addition to or instead of performing the functions or services by itself. In this case, the external electronic device 313 and the server 314 may carry out the requested function or the additional function, and transfer the result to the electronic device 301. The electronic device 301 may provide the requested functions or services based on the received result as is or after additionally processing the received result. To this end, for example, cloud computing, distributed computing, or client-server computing technology may be used.

The I/O interface 305 may receive a command or data from a user through an I/O device (for example, a sensor, a keyboard, or a touch screen) to the processor 303, the memory 304, the communication interface 307, and the VR management module 308, for example, through the bus 302. For example, the I/O interface 305 may provide data of a user touch received through the touch screen to the processor 303. Further, the I/O interface 305 may, for example, output a command or data received from the processor 303, the memory 304, the communication interface 307, and the VR management module 308 through the bus 302 to the I/O device (for example, a speaker or a display). For example, the I/O interface 305 may output voice data processed by the processor 303 to a user through the speaker.

The VR enabled display unit 306 may display various types of information (for example, multimedia data or text data) to a user. The VR enabled display unit 306 may be configured to include, but is not limited to, a liquid crystal display (LCD), a light emitting diode (LED) display, an organic LED (OLED) display, a plasma cell display, an electronic ink array display, an electronic paper display, a flexible LCD, a flexible electro-chromic display, and a flexible electro wetting display.

The communication interface 307 may provide communication between the electronic device 301 and the electronic device 313 or the server 314. For example, the communication interface 307 may be connected to a network 315 by wireless or wired communication and communicate with the external electronic device 313 or the server 314 over the network 315. The wireless communication may be conducted in conformance to, for example, at least one of wireless fidelity (WiFi), Bluetooth (BT), near field communication (NFC), global positioning satellite (GPS), and cellular communication (for example, long term evolution (LTE), LTE-advanced (LTE-A), code division multiple access (CDMA), wideband CDMA (WCDMA), universal mobile telecommunication system (UMTS), wireless broadband (WiBro), and global system for mobile communications (GSM)). The wired communication may be conducted in conformance to, for example, at least one of a universal serial bus (USB), a high definition multimedia interface (HDMI), recommended standard 232 (RS-232), or a plain old telephone service (POTS).

According to an embodiment of the present disclosure, the network 315 may be a communication network, for example, at least one of a computer network, the Internet, an Internet of Things (IoT), and a telephone network. At least one of the applications 312, the API 311, the middleware 310, the kernel 309, and the communication interface 307 may support a protocol (for example, a transport layer protocol, a data link layer protocol, or a physical layer protocol) for communication between the electronic device 301 and the external device 313.

According to an embodiment of the present disclosure, the device 301 enables viewing and controlling of transmitting devices through VR.

Referring to FIG. 3B, the device 301 is communicatively coupled with one or more transmitting devices (TDs) 316-1, 316-2, . . . 316-N (hereinafter referred to transmitting device 316 for denoting a single transmitting device and transmitting devices 316 for denoting plurality of transmitting devices) operating in a real world environment 317 (represented by a dashed square). The transmitting devices 316 are typically embedded with electronics, software, sensors, actuators, and network connectivity that enable these devices to perform designated tasks and to collect and exchange date over the network 315.

Such transmitting devices 316 include, but are not limited to, sensors, smart devices, wearable devices, and smart phone. Examples of sensors include, but are not limited to, proximity sensors and infrared sensors. Examples of smart devices include, but are not limited to, home automation devices such as a smart television (TV), a smart music system, smart speakers, smart sprinklers, a smart vacuum cleaner, a smart oven, and a smart lighting system. Examples of the wearable devices include, but are not limited to, smart watches, GPS trackers, and headphones. Examples of the real world environment 317 include, but are not limited to, a home, various rooms in a home, a vehicle, an office, a theatre, a museum, and other buildings.

Further, each of the transmitting devices 316 may be communicatively connected with other transmitting devices 316 in the real world environment 317. For example, a smart door may be further communicatively connected with a smart lock, a smart key set, a corridor light, and a smart phone. In addition, a master transmitting device may be communicatively connected with the rest of the transmitting devices 316. The master transmitting device controls the rest of the transmitting devices 316 The master transmitting device may be the transmitting device 316. The smart phone may be a master transmitting device for a smart door, a smart lock, a smart key set, and a corridor light. The master transmitting device may be a different device.

According to an embodiment of the disclosure, the device 301 enables viewing and controlling of transmitting devices through VR. Thus, the VR management module 308 may perform, for example, an operation for synthesizing a digital representation of a real world environment depicting graphical representations of transmitting devices in the real world environment and their corresponding status information and/or location information, and operation for controlling of the transmitting devices via the digital representation.

In accordance with an embodiment of the present disclosure, the digital representation is indicative of a VR environment or alternatively is a virtual replica corresponding to the real world environment 317. The digital representation is a direct representation of the real world environment 317. Examples of such direct representation include, but are not limited to, an image, a panorama image, a video, a 360-degree image, a 360-degree panorama image, and a 360-degree video.

Figure 4A:
FIGS. 4A and 4B illustrate digital representations obtained to synthesize an environment, according to an embodiment of the present disclosure.

Referring to FIG. 4A, a first example digital representation 400 in format of an image depicting a front view of a real world kitchen is illustrated. Various transmitting devices 401 are present in the digital representation 400. For example, transmitting device 401-1 indicates a smart oven, transmitting device 401-2 indicates a smart kettle, transmitting device 401-3 indicates a smart grinder, and transmitting device 401-4 indicates a smart coffee maker. In another embodiment, the digital representation is a processed representation of the real world environment 317. Examples of such processed representation include, but are not limited to, three-dimensional (3D) model created using 3D modelling software.

Figure 4B:
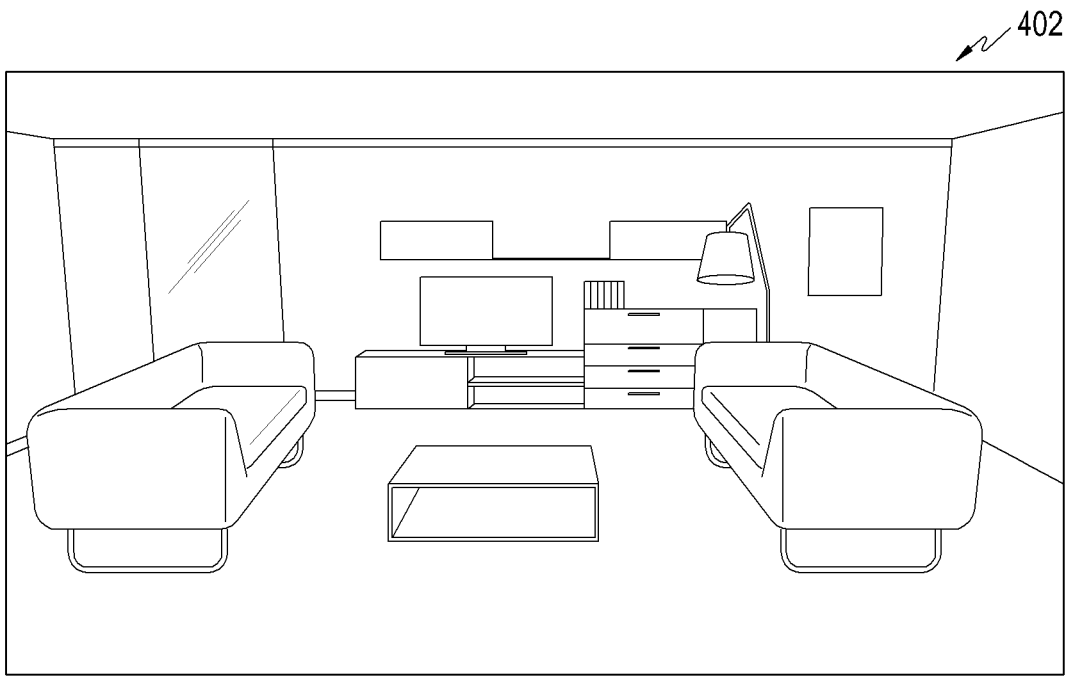

Referring to FIG. 4B, a second example digital representation 402 in format of 3D model created using 3D modelling software depicting front view of a real world living room is illustrated.

Figure 3C:
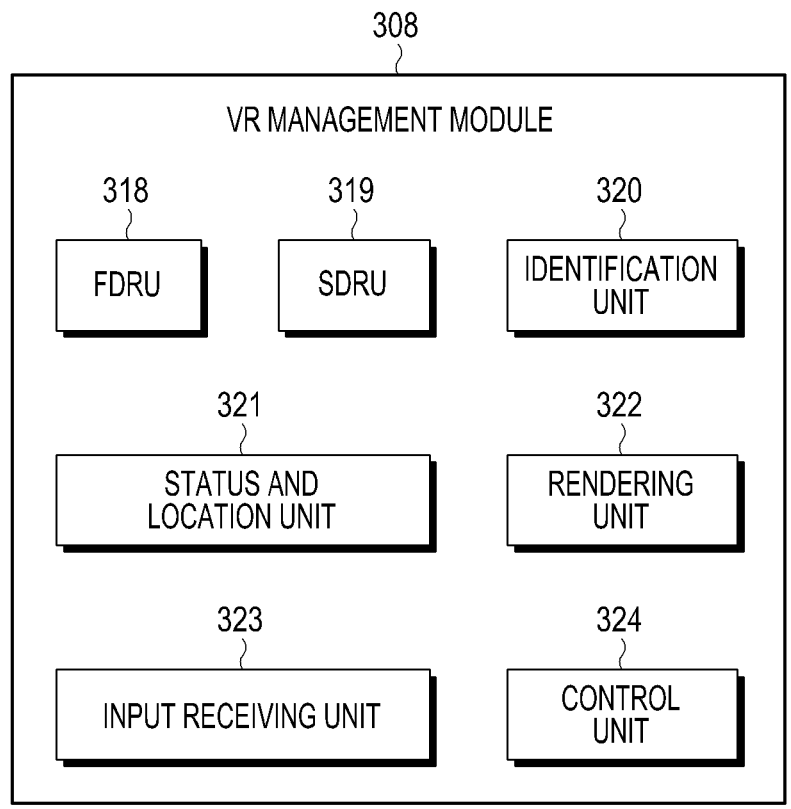
FIG. 3C is a block diagram of a VR management module in an electronic device, according to an embodiment of the present disclosure.
Figure 3D:
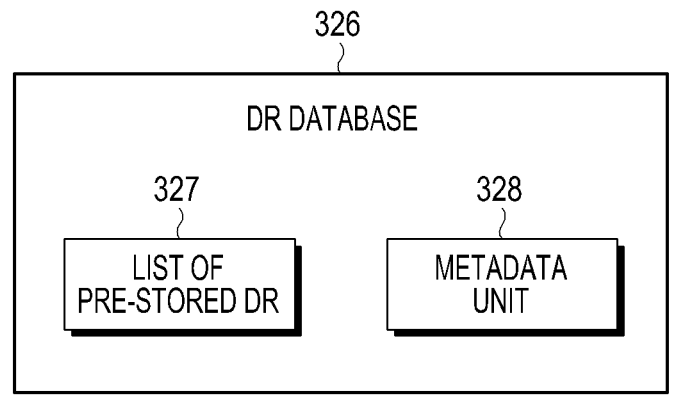
FIGS. 3D and 3E are block diagrams of databases coupled with an electronic device, according to an embodiment of the present disclosure.

Referring to FIG. 3C, a block diagram of the VR management module 308 in the electronic device 301 is illustrated according to an embodiment of the present disclosure. The VR management module 308 includes a first digital representation unit (FDRU) 318, a second digital representation unit (SDRU) 319, an identification unit 320, a status and location unit 321, a rendering unit 322, an input receiving unit 323, and a control unit 324. The FDRU 318, the SDRU 319, the identification unit 320, the status and location unit 321, the rendering unit 322, the input receiving unit 323, and the control unit 324 may be software modules. The FDRU 318, the SDRU 319, the identification unit 320, the status and location unit 321, the rendering unit 322, the input receiving unit 323, and the control unit 324 may be hardware modules. The FDRU 318, the SDRU 319, the identification unit 320, the status and location unit 321, the rendering unit 322, the input receiving unit 323, and the control unit 324 may be a combination of software and hardware modules. A single unit may perform functions of any combination of the units from the FDRU 318, the SDRU 319, the identification unit 320, the status and location unit 321, the rendering unit 322, the input receiving unit 323, and the control unit 324.

In an embodiment of the present disclosure, the FDRU 318 obtains a digital representation of the real world environment 317. The input receiving unit 323 receives a user-input to obtain the digital representation. The input receiving unit 323 receives the user-input through a VR enabled input unit 325 communicatively coupled with the device 301. Examples of the VR enabled input unit 325 include, but are not limited to, a head mounted device, a smart glove, a joystick, a smart stylus, a smart touch interface, an eye gaze tracking input device, and a voice input device. The VR enabled input unit 325 is integrated with the electronic device 301. The electronic device 301 is a standalone VR device having VR processing and VR rendering capabilities. The VR enabled input unit 325 is external to the electronic device 301. The electronic device 301 such as a smart phone is coupled with the VR enabled input unit 325 such as an HMD.

In an embodiment of the present disclosure, the FDRU 318 obtains a digital representation by capturing the digital representation of the real world environment 317 in real time. The input receiving unit 323 receives a user-input as being a selection of an option to capture the digital representation in real time. The FDRU 318 captures the image of the real world using a VR enabled image-capturing unit in real time upon receiving the user-input. The VR enabled image-capturing unit may be internal to the device 301. The VR enabled image-capturing unit may be external to the device 301. The device 301 may access the VR enabled image-capturing unit directly. The device 301 may access the VR enabled image-capturing unit over the network 315. A device having the VR enabled image-capturing unit may transmit the image to the device 301.

In an embodiment of the present disclosure, the FDRU 318 obtains the digital representation by fetching the digital representation from a digital representations (DR) database 326 communicatively coupled with the device 301. The DR database 326 includes a list of pre-stored digital representations 327 corresponding to real world environments. The DR database 326 may be external to the device 301 and may be accessed by the device 301 directly. The device 301 may access the DR database 326 over the network 315. In accordance with a non-illustrated option, the DR database 326 may be internal to the device 301.

The VR enabled image-capturing unit captures, processes (as deemed necessary), and stores the digital representations in the DR database 326. While capturing and storing, location information and identification information of the corresponding real world environment is stored as metadata 328 in the DR database 326. The location information may be obtained from one or more positioning systems 329 (hereinafter referred to positioning system 329 for denoting a single positioning system and positioning systems 329 for denoting plurality of positioning systems) over the network 315. Examples of the positioning systems 329 include, but are not limited to, GPS, an indoor position system (IPS), and local positioning system (LPS). The IPS may be based on various technologies. Examples of such technologies include, but are not limited to, magnetic positioning, inertial measurements, WiFi-based positioning system (WPS), Bluetooth, choke point concepts, grid concepts, long range sensor concepts, angle of arrival, time of arrival, and received signal strength indication.

Further, a relative location and dimension information of the real world environment is stored as the metadata 328 in the DR database 326. The relative location and dimension information is obtained from the captured digital representation. In addition, location information of the VR enabled image-capturing unit is stored in the metadata 328. The metadata 328 may be stored in a tabular form, for example, as illustrated below Table 1.

TABLE 1

| S. No. | Unique ID | Digital Representation Identifier | Identification information of Real World Environment | Location Information of Real World Environment | Relative location and dimension information |
|---|---|---|---|---|---|
| 1 | DR1-L1 | .JPEG | Left Side of Kitchen | X1, Y1, Z1 | x1, y1, z1 |
| 2 | DR1-R1 | .JPEG | Right Side of Kitchen | X2, Y2, Z2 | x2, y2, z2 |
| 3 | DR1-F1 | 3D model | Front of Kitchen | X3, Y3, Z3 | x3, y3, z3 |
| 4 | DR1-C1 | 360 degree image | Kitchen | X11, Y11, Z11 | x11, y11, z11 |

Further, in an embodiment of the present disclosure, the input receiving unit 323 receives a user-input as being a selection of the real world environment 317 from a list of pre-stored real world environments. Upon receiving the user-input, the FDRU 318 fetches the digital representation corresponding to the selected real world environment 317 from the DR database 326.

Referring to FIG. 4A, the image of the real world kitchen along with images of real world living room, bedroom, and dining room is pre-stored in the DR database 326. The FDRU 318 fetches image of the real world kitchen in real time from the DR database 326.

Further, the input receiving unit 323 may receive the user-input as being a navigation input on the digital representation other than the aforementioned inputs. In one embodiment, the user-input is navigation from a first digital representation of the real world environment to a second digital representation of the real world environment. In an example, the user-input is navigation from a front view digital representation of the kitchen to a left-side view digital representation of the kitchen. In an embodiment, the user-input is navigation from a digital representation of a first real world environment to a digital representation of a second real world environment. In an example, the user-input is navigation from digital representation of the kitchen to digital representation of the living room. In an embodiment, the user-input is navigation within the digital representation of the real world environment. In an example, the user-input may be zoom in or zoom out of digital representation of the kitchen. In these embodiments, the FDRU 318 obtains the digital representation either by capturing real digital representation or by fetching pre-stored digital representation, as described above.

Upon obtaining the digital representation, the identification unit 320 identifies the transmitting devices 316 from the digital representation. In one embodiment, the identification unit 320 identifies the transmitting devices 316 based on a user-input indicative of labelling the transmitting devices 316 on the digital representation. The user-input may be non-touch input and touch input. In such an embodiment, the input receiving unit 323 receives the user-input from the VR enabled input unit 325.

In one embodiment, the identification unit 320 identifies the transmitting devices 316 based on metadata associated with the digital representation. Accordingly, the identification unit 320 fetches metadata from the metadata unit 328 in the DR database 326 to identify the transmitting devices 316. In an example, the digital representation is a 3D model. As such, the metadata includes scaled-down information of real world in the 3D model as the relative location and dimension information. Based on a mapping of the relative location and dimension information and the location information of real world environment from the metadata from the metadata unit 328, the identification unit 320 identifies the transmitting devices 316 on the digital representation.

In one embodiment, the identification unit 320 identifies the transmitting devices 316 based on processing of content within the digital representation and the metadata 328. Accordingly, the identification unit 320 processes the content by using image/media recognition techniques. The identification unit 320 may further obtain location information of the transmitting devices 316 from the at least one positioning system 329. The location information provides real-time location of the transmitting device 316 in the real world environment 317 in form of precise coordinates. Based on output of image/media processing and the location information, the identification unit 320 identifies the transmitting devices 316 within the digital representation.

In one embodiment, the identification unit 320 identifies the transmitting devices 316 based on the metadata in the metadata unit 328 and location information of a device capturing the digital representation of the real world environment or the VR enabled image-capturing unit. In one embodiment, the identification unit 320 identifies the transmitting devices 316 based on the metadata in the metadata unit 328 and location information of the transmitting devices 316 available in proximity to the location information of the VR enabled image-capturing unit. In one embodiment, the identification unit 320 obtains the location information of the transmitting devices 316 from at least one positioning system 329. Based on the above-mentioned location information(s), the identification unit 320 identifies the transmitting devices 316 within the digital representation. In one embodiment, the identification unit 320 identifies the transmitting devices 316 based on combination of the above-mentioned information/processing.

Upon identification of the transmitting devices 316, the status and location unit 321 obtains at least one of status information and location information of the transmitting devices 316. The status information includes information corresponding to at least one device identifier and at least one device parameter of the transmitting device(s) 316. The at least one device identifier includes a unique identification number, device name, unique address such IP address and MAC address, date and time stamp, and optionally user name, user photograph, and manufacturer. The at least one device parameter includes operational status, mode of operation, battery status, type of network connection, availability of said network connection, connection with one or more further transmitting devices, and status of said network connection with one or more further transmitting devices. For example, a smart door may have following values corresponding device parameters:

Operational Status or Door Status: Open/Close/Partially Open

Battery Status: 68%

Type of network connection type: WiFi

Availability of network connection or Connection Status: Active

Connection with further transmitting devices: Smart Lock, Smart Keys, and Corridor Light.

Connection Status with further transmitting devices: Active

Some of the device parameters may be standard parameter while some of the device parameters may be custom parameter based on type of the transmitting device. The standard parameter may be, but is not limited to, battery status, type of network connection, and availability of said network connection. The custom parameter may be, but is not limited to, operational status and mode of operation. For example, a smart oven may have custom parameter as mode of operation being convection heating, grill heating, and microwave heating. On the contrary, a smart speaker may have the custom parameter as operational status based on volume, bass, treble, and the like.

In one embodiment, the status and location unit 321 obtains the status information directly from the transmitting devices 316. In one embodiment, the transmitting devices 316 transmits the status information to the status and location unit 321 when a value of said at least one device parameter changes. In one embodiment, the transmitting devices 316 transmits the status information to the status and location unit 321 when a value of said at least one device parameter exceeds a predetermined threshold level. The status information may be sent/received either periodically or in real time.

In one embodiment, the status and location unit 321 obtains the status information from an intermediary device 330 communicatively coupled with the transmitting devices 316. The intermediary device 330 may be any device having transmitting and receiving capabilities and is connected with the transmitting device(s) 316 and the device 301. As such, the intermediary device 330 enables transmission of data by the transmitting device(s) 316 over the network 315 when the transmitting device(s) 316 are not able to connect with the network 315 directly. The intermediary device 330 may support various communication technologies such as Bluetooth, Zigbee, Z-Wave, 6LowPAN, Thread, WiFi, Mobile Cellular, NFC, Sigfox, Neul, LoRaWAN, Satellite, Ethernet, and HART. Example of the intermediary device 330 is an Internet gateway.

Further, in one embodiment, the intermediary device 330 may provide the status information in real time when requested by the status and location unit 321. In one embodiment, the intermediary device 330 may provide the status information by periodically polling the transmitting devices 316. In such an embodiment, the intermediary device 330 may provide the status information when a value of said at least one device parameter changes. In such implementation, the intermediary device 330 may also provide the status information when a value of said at least one device parameter exceeds a predetermined threshold level. In one example, the intermediary device 330 may obtain information from the transmitting device 316. In another example, the intermediary device 330 may obtain from a second transmitting device connected with a first transmitting device to obtain the information of the first transmitting device and/or the second transmitting device.

Further, as described earlier, the location information of the transmitting device 316 provides real-time location of the transmitting device 316 in the real world environment 317 in form of precise coordinates. Accordingly, in one embodiment, the status and location unit 321 obtains the real-time location directly from the transmitting device 316. In such an embodiment, the transmitting device 316 may include a location identification module (not shown in the figure) to identify and provide precise coordinates. The location identification module may be based on currently known location identification technologies such as GPS and IPS.

In one embodiment, the status and location unit 321 obtains the real-time location from the at least one positioning system 329, as described earlier.

In one embodiment, the status and location unit 321 obtains the real-time location from the master transmitting device. In such an embodiment, the master transmitting device may include the location identification module in addition to the transmitting device 316. Thus, the master transmitting device may obtain the real-time location from other transmitting devices 316 and then provide the real-time location to the status and location unit 321.

In one embodiment, the status and location unit 321 obtains the real-time location from the intermediary device 330, as described earlier.

In all the above embodiments, the transmitting devices 316 create data packet to transmit the status information, as known in the art, to either the intermediary device 330 or the status and location unit 321. Similarly, the location information is transmitted using a data packet, as known in the art. It would be understood, that any other mechanism may be used to transmit the status information and the location information to corresponding recipients.

Further, upon obtaining the aforesaid information, the status and location unit 321 may store the status information and/or the location information in a status and location information (SLI) database 331. In an example, the SLI database 331 may be external to the device 301. In one option, the device 301 may access the SLI database 331 directly. In another option, the device 301 may access the SLI database 331 over the network 315. In another example, the SLI database 331 may be internal to the device 301. The status information and the location information may be stored as in a tabular form, as, for example, illustrated below in Table 2.

TABLE 2

| S. No. | Device Identifier |
|---|---|
| 1 | Unique ID |
| 2 | Unique Address |
| 3 | Device Name |
| 4 | User Name |
| 5 | User Photograph |
| 6 | Manufacturer |

| S. No. | Device Parameter Digital Representation Identifier | Predefined Threshold Level | History with Date and Time Stamp | Current Value |
|---|---|---|---|---|
| 1 | Operation Status | | | |
| 2 | Mode of Operation | | | |
| 3 | Battery status | | | |
| 4 | Type of network connection | | | |
| 5 | Availability of network connection | | | |
| 6 | Connection with one or more further transmitting devices | | | |

TABLE 2-continued

| 7 | Status of said network connection with one or more further transmitting devices |
|---|---|
| 8 | Other Parameter 1 |
| 9 | Other Parameter 2 |
| 10 | ... |
| 11 | ... |
| 12 | Other Parameter N |

Further, based on the obtained status information and/or location information, the SDRU 319 creates a modified digital representation of the real world environment 317. The modified digital representation includes a graphical representation of the identified transmitting devices 316 in conjunction with at least one of the status information and the location information.

Figure 3E:
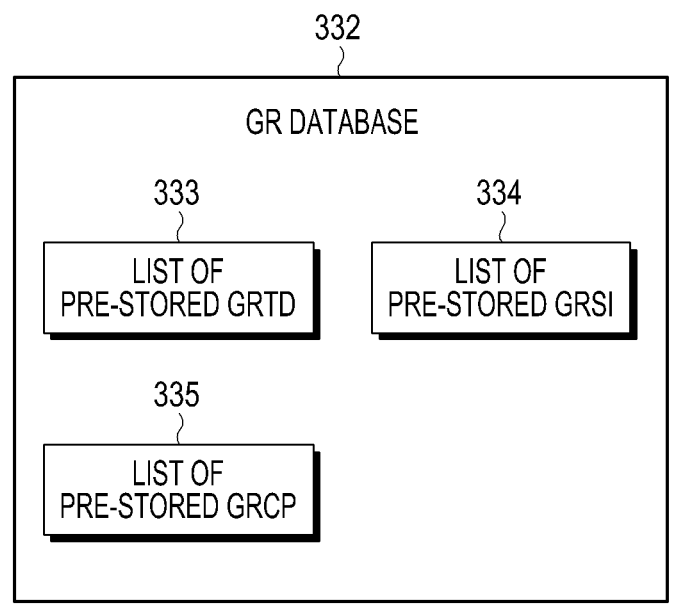

In one embodiment, the status and location unit 321 may obtain only the status information. In such an embodiment, the SDRU 319 obtains graphical representations of the identified transmitting devices 316 and graphical representations indicative of the status information from a graphical representation (GR) database 332. Examples of the graphical representations include, but not limited to, icons. The GR database 332, as illustrated in FIG. 3E, includes a list of pre-stored graphical representations 333 (referred in FIG. 3E as GRTD) of transmitting devices 316 mapped with corresponding device identifiers of the transmitting devices 316. In a similar manner, as illustrated in FIG. 3E, the GR database 332 includes a list of pre-stored graphical representations 334 (referred in FIG. 3E as GRSI) indicative of various types of status information. For example, a graphical representation of battery with low charge may be indicative of battery status with 10%. In an example, the GR database 332 may be external to the device 301. In an example, the GR database 332 may be internal to the device 301. In an example, the GR database 332 accessed over the network 315.

Upon retrieving the graphical representation of the identified transmitting devices 316 and the status information, the SDRU 319 superimposes the graphical representation of the identified transmitting devices 316 and the status information on the digital representation to create the modified digital representation. The graphical representation of the identified transmitting devices 316 are positioned on the digital representation at a location mapping the location of the identified transmitting devices 316 in the real world environment 317, as described earlier. Upon creation of the modified digital representation, the rendering unit 322 renders/displays the modified digital representation on a VR enabled display unit 322 coupled with the device 301.

In one embodiment, the status and location unit 321 may obtain the status information and the location information. In such an embodiment, the SDRU 319 maps a real-time location of the identified transmitting devices 316 on the digital representation based on the location information. Upon mapping, the SDRU 319 obtains the graphical representations of the identified transmitting devices 316 and the graphical representations indicative of the status information from the GR database 332. Thereafter, the SDRU 319 superimposes the graphical representations of transmitting devices 316 and the graphical representations of the status information on the digital representation at the mapped real-time location to create the modified digital representation. Such mapping of real-time location enables representing the transmitting devices 316 at exactly same location, as they are present in the real world environment 317 at time of obtaining the location information.

Further, the status information and/or location information may be represented via audio indicators. Examples of such audio indicators include, but not limited to, pre-stored speech notifications indicative of various types of status information and/or location information and pre-stored tones/chimes/music/notes indicative of various types of status information and/or location information. The audio indicators may be stored in the GR database 332.

In one such an embodiment, the SDRU 319 obtains the audio indicators from the GR database 332 based on the status information and directs an audio output device located in the real world environment 317 to play the audio indicator. In another such embodiment, the SDRU 319 obtains the audio indicators from the GR database 332 based on the status information and location information. In such an embodiment, the SDRU 319 may detect an audio output device located in the real world environment 317 that may be located in proximity to the location information and direct such detected audio output device to play the audio indicator. In one example, the audio device may itself be the transmitting device 316. In one example, the audio device may be located in proximity to the transmitting device 316 and may be communicatively coupled with the device 301. Examples of such audio output device include, but not limited to, wired speakers and wireless speakers.

Further, as described earlier, the status information and the location information is stored in the SLI database 331. In addition, the status and location unit 321 receives the status information and the location information when a corresponding values changes or corresponding value exceeds predetermined threshold values. Thus, the SDRU 319 may also determine a variation in the status information and/or the location information. Upon determining the variation, the SDRU 319 again creates a further modified digital representation of the real world environment 317, as described earlier. The further modified digital representation includes the graphical representation of the transmitting device 316 in conjunction with the determined variation. Further, in one embodiment, the SDRU 319 may direct the audio output device to play an audio indicator corresponding to the determined variation, as described earlier.

Thus, the present disclosure enables viewing of transmitting devices available in a real world environment via a virtual reality space or digital representation on a VR enabled display unit. This provides a better user-experience as a need for physically visiting a location of the transmitting devices is eliminated.

FIGS. 5A, 5B, 5C, 6A, 6B, 7A, 7B, 7C, and 7D illustrate various examples of viewing transmitting devices via a digital representation, in accordance with one embodiment of the disclosure. In the examples, a display unit of the smart phone functions as the VR enabled display unit 325 and an HMD and/or the other devices such as smart gloves functions as a VR enabled input unit.

Figure 5A:
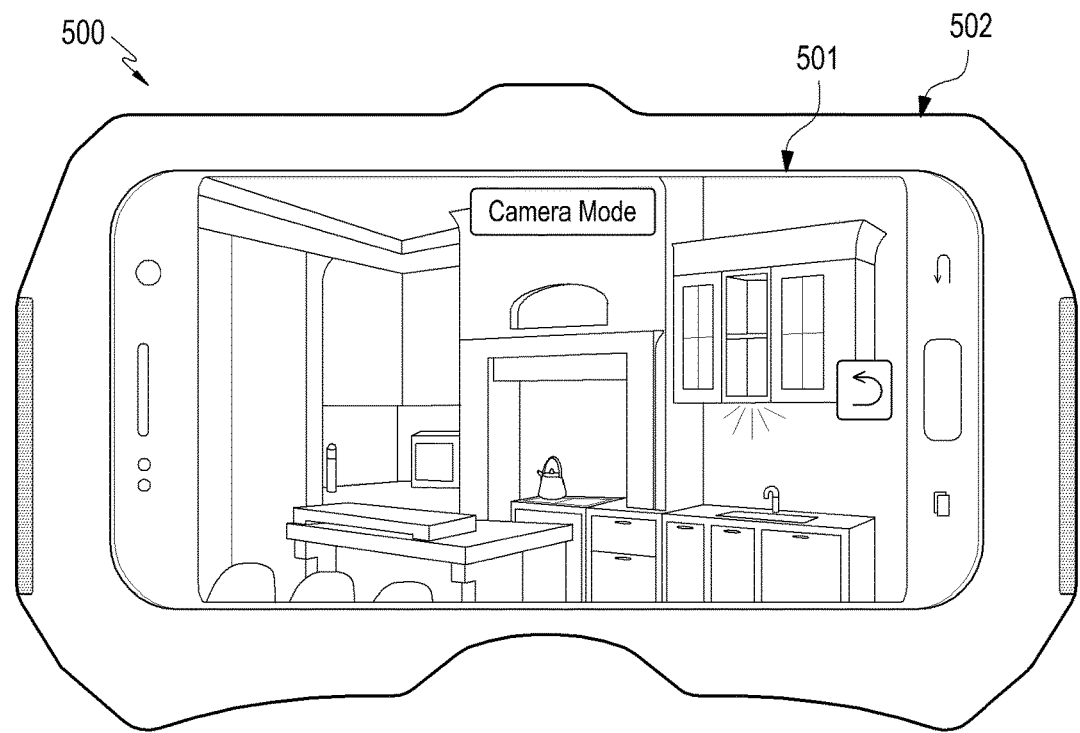
FIGS. 5A, 5B, and 5C illustrate viewing transmitting devices via a digital representation, according to an embodiment of the present disclosure.
Figure 5B:
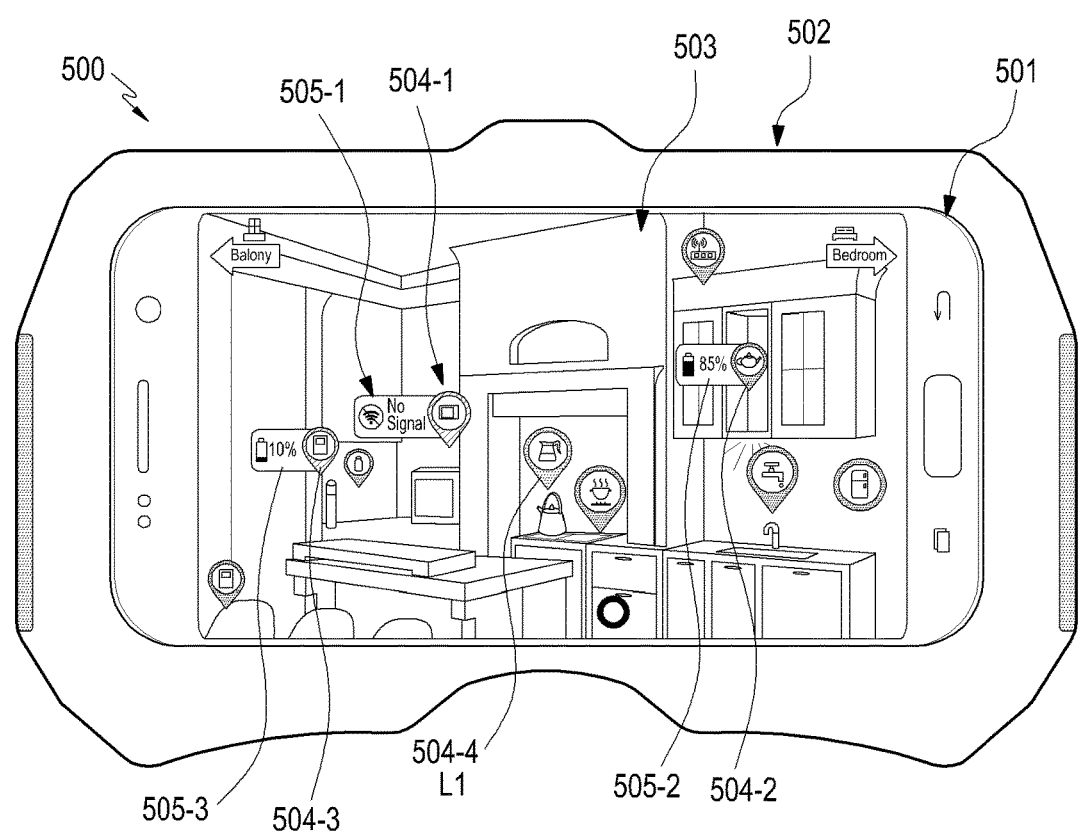
Figure 5C:
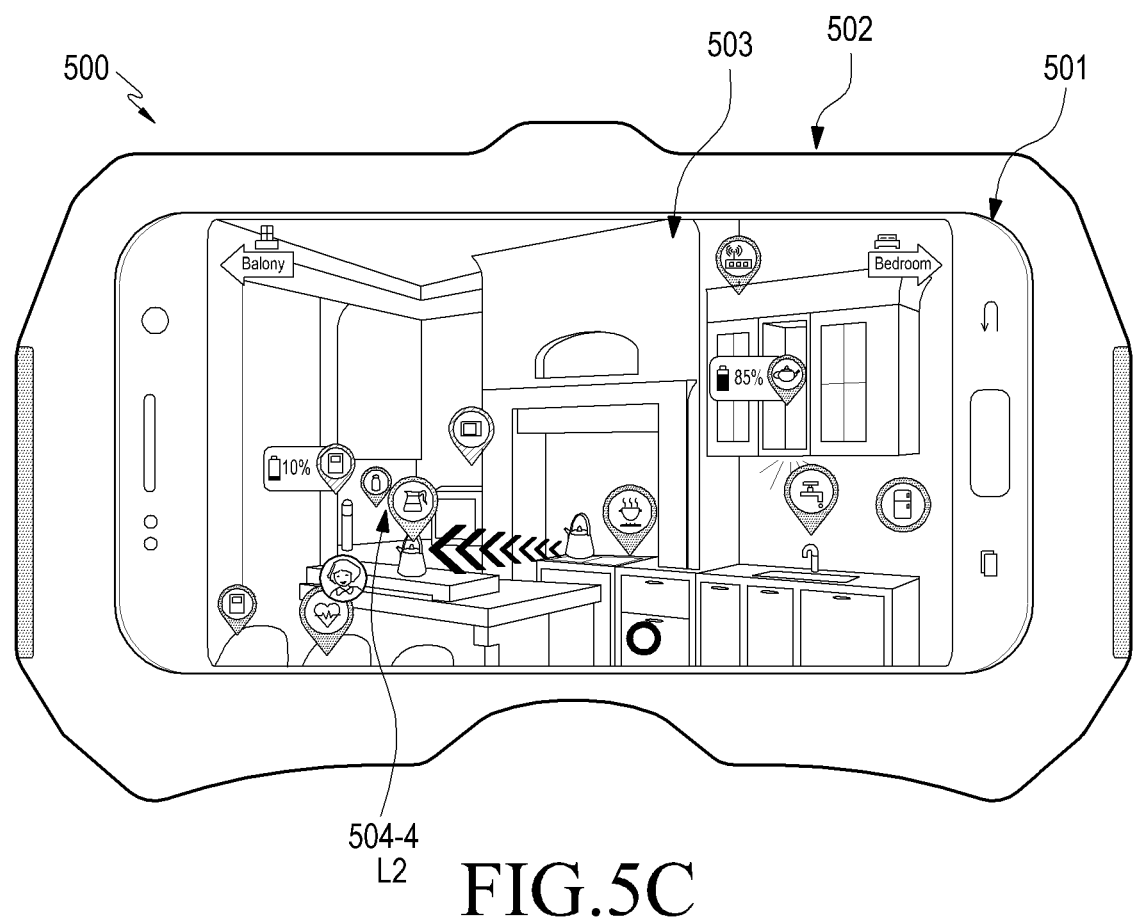

FIGS. 5A, 5B, and 5C illustrate a first example 500 of viewing transmitting devices via a digital representation, in accordance with one embodiment of the disclosure. In the example, a VR enabled display unit 501 displays a digital representation. HMD 502 and/or other VR enabled input units (not shown in the figure) provide user-input.

Referring to FIG. 5A, the VR enabled display unit 501 displays a real image of a front view of a real world kitchen in a camera mode of the device 301. The input receiving unit 323 receives a user-input via the HMD 502 and/or other VR enabled input units. The user-input is indicative of a selection of an option to capture the digital representation in real time.

Referring to FIG. 5B, upon receiving the user-input, the SDRU 319 displays a digital representation 503 on the VR enabled display unit 501 in a manner as described above. The digital representation 503 includes graphical representation(s) 504 of identified transmitting device(s) and graphical representation(s) 505 of corresponding status information. As illustrated, graphical representation 504-1 indicates smart oven and graphical representation 505-1 indicates 'no network connection' status information (e.g., no signal). The graphical representation 504-1 is positioned near an image of a kettle indicating a real world position of the kettle in the real world kitchen. Similarly, graphical representation 504-2 indicates a smart kettle and graphical representation 505-2 indicates '85%' of battery status. Similarly, graphical representation 504-3 indicates smart grinder and graphical representation 505-3 indicates '10%' of battery status. Similarly, graphical representation 504-4 indicates smart coffee maker. However, when status information for a transmitting device is not available, a corresponding graphical representation is not provided on the digital representation. Thus, the smart coffee maker does not have a graphical representation corresponding to status information.

Further, the graphical representation 504-4 indicates smart coffee maker is at location L1. However, while obtaining the status information and location information, location of the coffer maker changes from L1 to L2 in FIG. 5C. The change in location may be, for example, due to a person arriving in the kitchen and using the coffee maker. As such, the SRDU 306 maps the graphical representations 504-4 at the location L2.

Referring to FIG. 5C, the digital representation 503 includes the graphical representations 504-4 at location L2 and a direction arrow indicating change in location from L1 to L2.

Figure 6A:
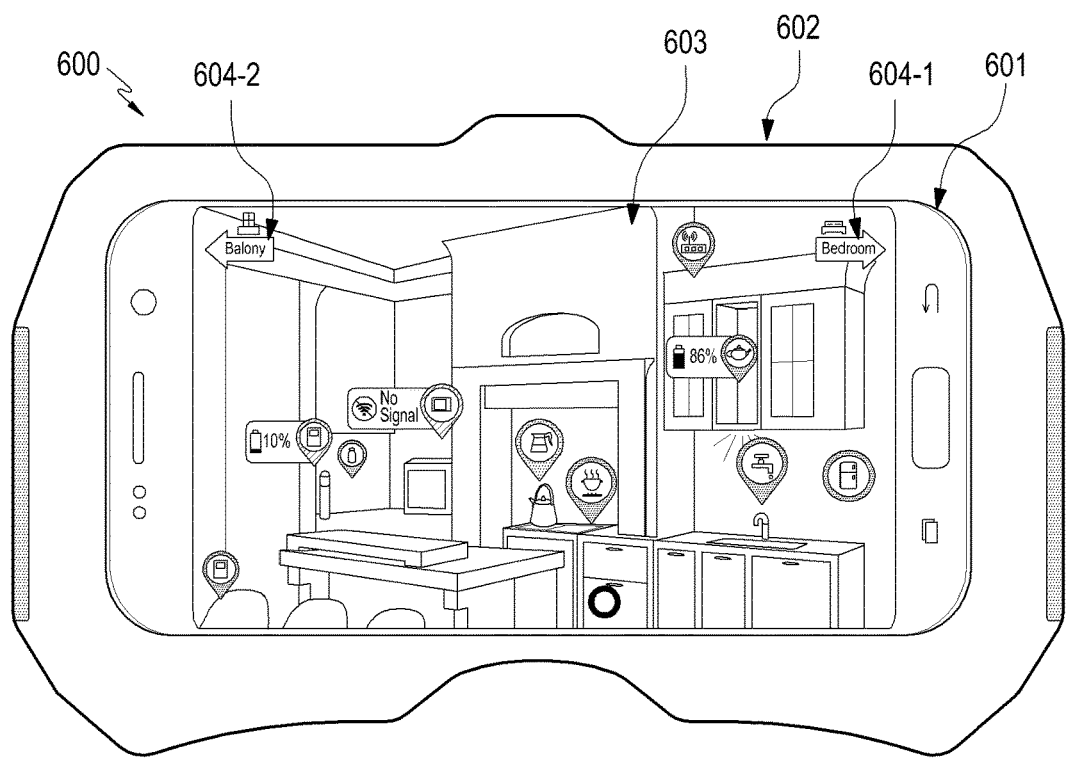
FIGS. 6A and 6B illustrate digital representations for viewing transmitting devices via VR, according to an embodiment of the present disclosure.
Figure 6B:
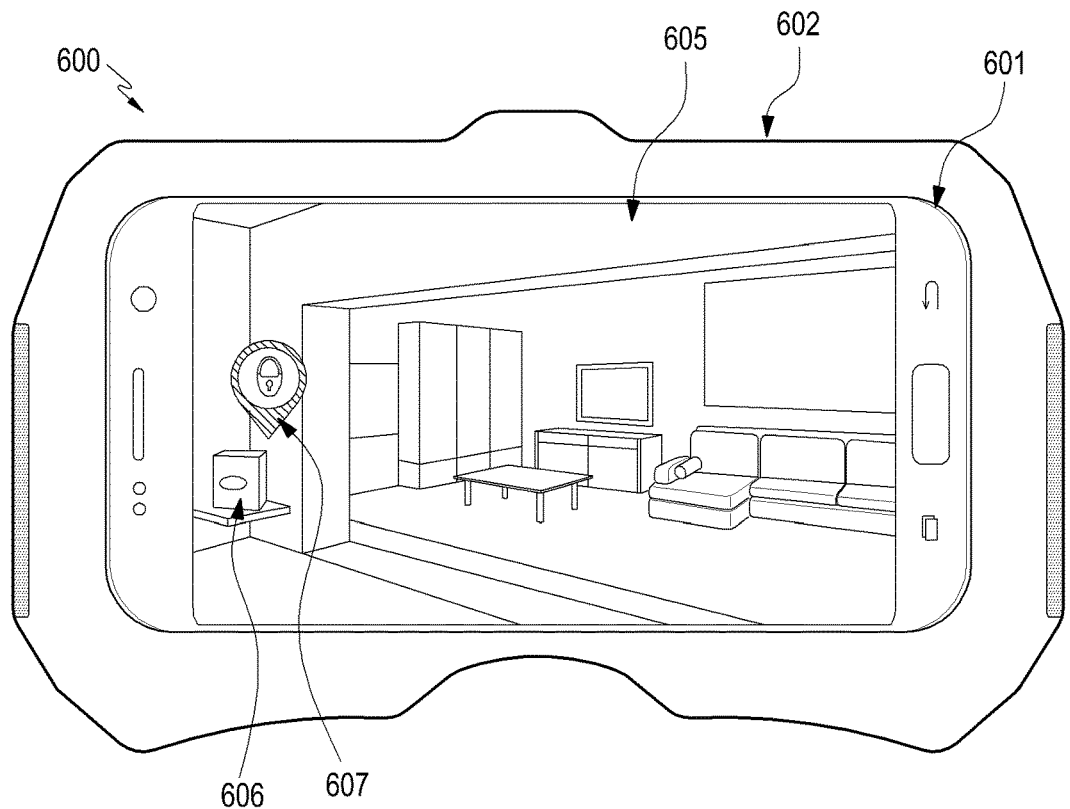

FIGS. 6A and 6B illustrate a second example 600 of viewing transmitting devices via a digital representation, in accordance with one embodiment of the present disclosure. In the example, a VR enabled display unit 601 displays a digital representation. HMD 602 and/or other VR enabled input units (not shown in the figure) provide user-input.

Referring to FIG. 6A, the VR enabled display unit 601 displays a digital representation 603 including graphical representations of transmitting devices and graphical representations of corresponding status information. The digital representation 603 is a virtual replica of a front view of a real world kitchen, as illustrated in FIG. 5B.

As described above, a user may navigate virtually within the present environment for selecting an environment different from the present environment. In one embodiment, the user may navigate by providing input via the VR enabled input unit 325. In one example of such an embodiment, the input may be a head motion along a direction of the different environment. In another example of such an embodiment, the input may be a hand movement or gesture along a direction of the different environment. In another embodiment, user-selectable options are provided on the digital representation.

The digital representation 603 further includes one or more environment selection options 604. The environment selection options 604 may be represented in various forms such as icons and hyperlinks. The environment selection option 604-1 enables a selection of real world environment 'balcony'. Similarly, environment selection option 604-2 enables a selection of real world environment 'bedroom'.

The input receiving unit 323 then receives a user-input via the HMD 603 and/or other VR enabled input units. The user-input is indicative of navigation from a digital representation of a first real world environment to a digital representation of a second real world environment. The user-input is indicative of selection the environment selection option 604-2.

Upon receiving the selection, the FDRU 318 obtains a digital representation of the bedroom as described earlier. Thereafter, the SDRU 319 renders a corresponding modified digital representation including graphical representations of transmitting devices present in the bedroom and corresponding status information, as described above.

Referring to FIG. 6B, the VR enabled display unit 601 displays a digital representation 605 of the real world bedroom. The digital representation 605 is a virtual replica of a front view of the real world bedroom. The digital representation 605 includes graphical representations of transmitting devices available in the bedroom and graphical representations of corresponding status information. Graphical representation 606 indicates smart locker and graphical representation 607 indicates a locked status.

FIGS. 7A, 7B, 7C, and 7D illustrate a third example 700 of viewing transmitting devices via a digital representation, in accordance with one embodiment of the present disclosure. In the example, a VR enabled display unit 701 displays a digital representation. HMD 702 and/or other VR enabled input units provide user-input.

Figure 7A:
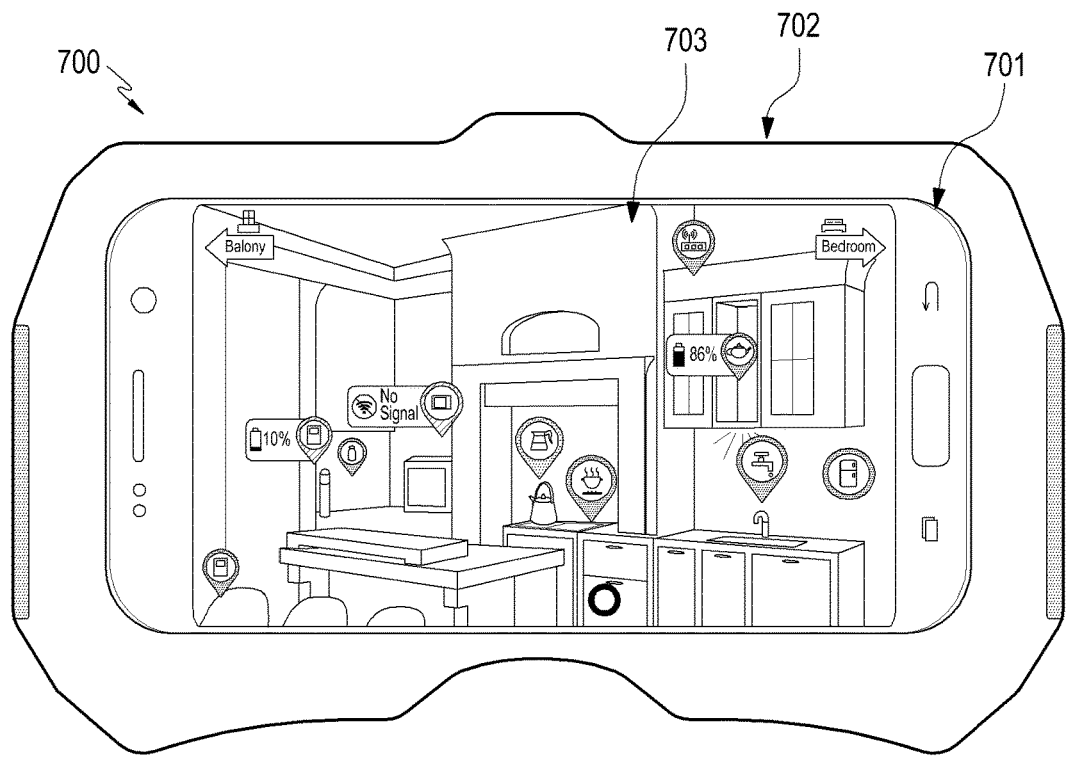
FIGS. 7A, 7B, 7C, and 7D illustrate digital representations for viewing transmitting devices via VR, according to an embodiment of the present disclosure.

Referring to FIG. 7A, the VR enabled display unit 701 displays a digital representation 703 including graphical representations of transmitting devices and graphical representations of corresponding status information. The digital representation 703 is a virtual replica of a front view of a real world kitchen, as illustrated in FIG. 5B.

The input receiving unit 323 receives a user-input via the HMD 703 and/or other VR enabled input units. The user-input is indicative of navigation within a digital representation. In the example, the user-input is indicative of zooming out on the digital representation 703 to get a bird's eye view of all transmitting devices available in a house.

Upon receiving the selection, the FDRU 318 obtains digital representation of entire house. In an embodiment, such digital representation may be obtained by combining digital representations of all rooms in the house. Thereafter, the SDRU 319 renders a corresponding modified digital representation including graphical representations of transmitting devices present in all the rooms and corresponding status information, as described above.

Figure 7B:
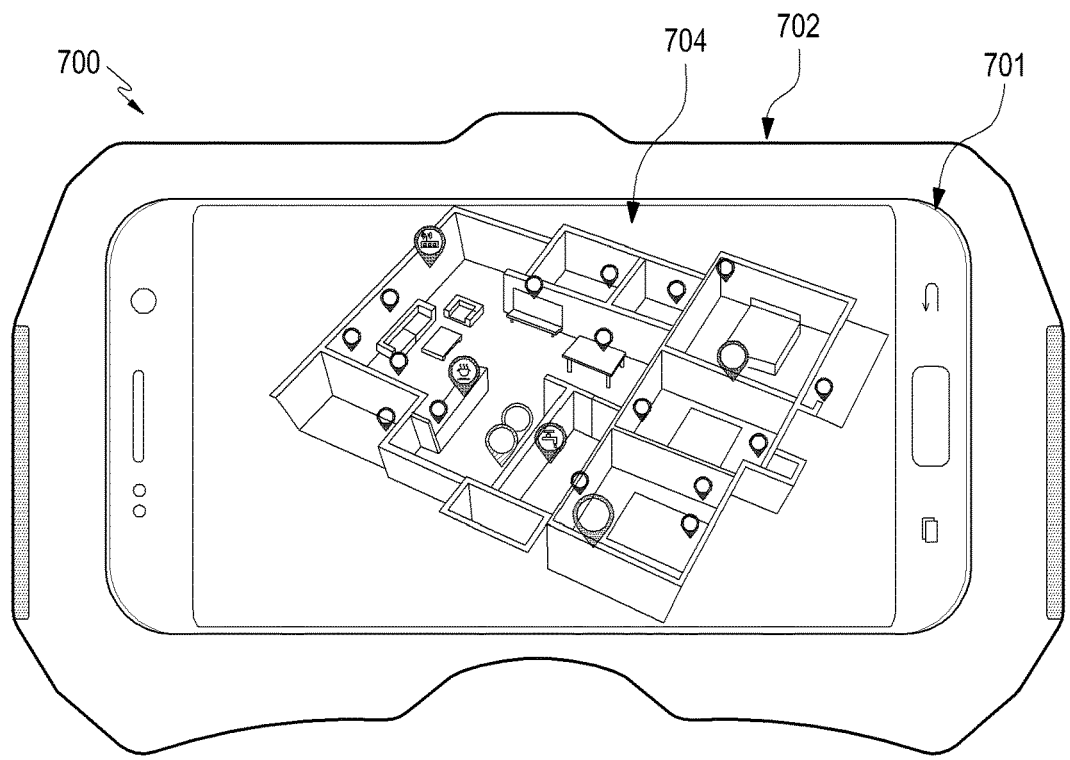

Referring to FIG. 7B, the VR enabled display unit 701 displays a digital representation 704 of the real world house. The digital representation 704 is a virtual replica of a bird's eye view or top view of the real world house. The digital representation 704 includes graphical representations of transmitting devices available in the entire house and graphical representations of corresponding status information.

Further, the input receiving unit 323 may receive another user-input via the HMD 703 and/or other VR enabled input units on the digital representation 704. The user-input is indicative of simultaneously displaying multiple locations having transmitting devices. The multiple locations may also include the present location being viewed through the digital representations 703 and 704. Upon receiving the user-input, the FDRU 318 fetches the digital representations of the multiple locations from the DR database 326, as described in FIG. 3A. The VR enabled display unit 701 then displays digital representations. In one example, the digital representation may be a subset of the other digital representation. In one example, the digital representation may be a combination of various digital representations. These digital representations are similar to the digital representations illustrated in FIGS. 4A and 4B.

Figure 7C:
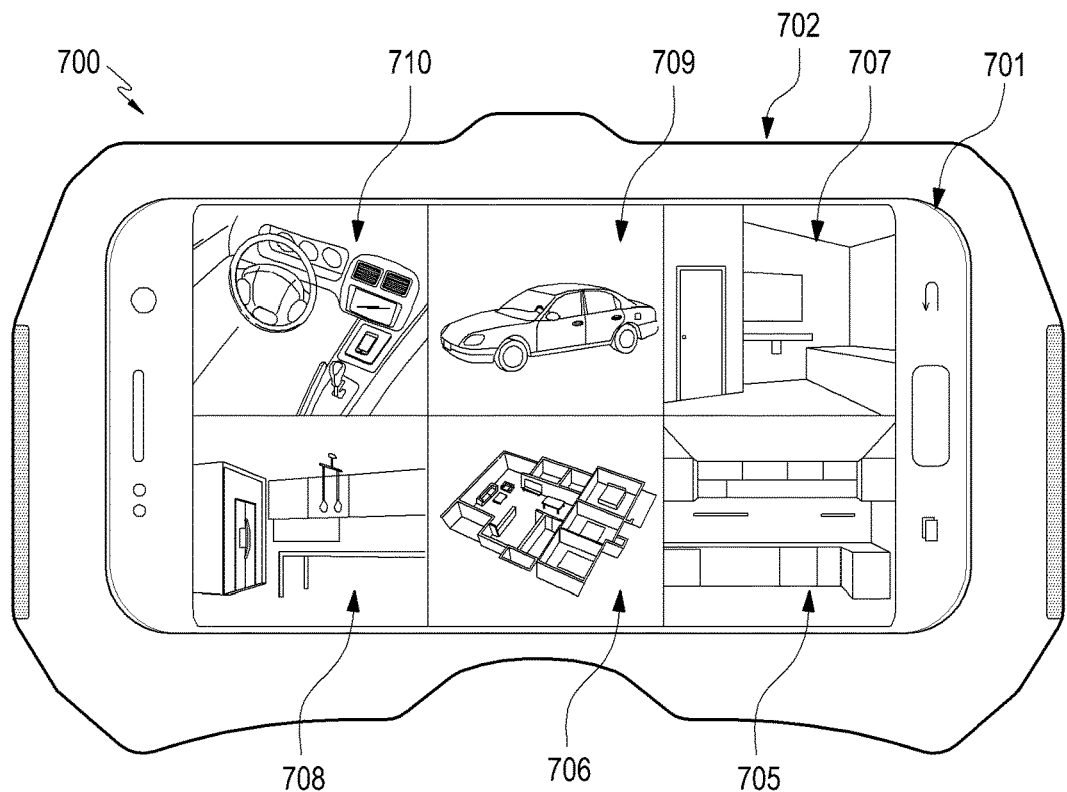

Referring to FIG. 7C, the VR enabled display unit 701 displays digital representation 705 of first location such as kitchen and the digital representation 706 of second location such as house. Similarly, the VR enabled display unit 701 displays digital representation 707 of third location such as bedroom and digital representation 708 of fourth location such as dining hall. As may be observed, the digital representations of kitchen, bedroom, and dining hall are subsets of the digital representation of the house. Further, the VR enabled display unit 701 displays digital representation 709 of fifth location such as car and digital representation 710 of sixth location such as interior of the car at driver's location. As may be observed, the digital representation of interior of the car at driver's location is subset of the digital representation of the car.

The various digital representations of multiple locations may be arranged in any manner and/or using any size on the VR enabled display unit 701 based on a screen size and/or user preference(s). Such arrangement is performed using techniques as known in the art.

Further, the input receiving unit 323 may receive another user-input via the HMD 703 and/or other VR enabled input units on the digital representation 704. The user-input is indicative of a selection of any one of the digital representations to view the transmitting devices present in the selected location. In the figure, the user-input is indicative of selection the digital representation 709 of car, i.e., the fifth location. Upon receiving the user-input, the SDRU 319 renders a corresponding modified digital representation including graphical representations of transmitting devices present in the selected location and corresponding status information, as described in FIG. 3B.

Figure 7D:
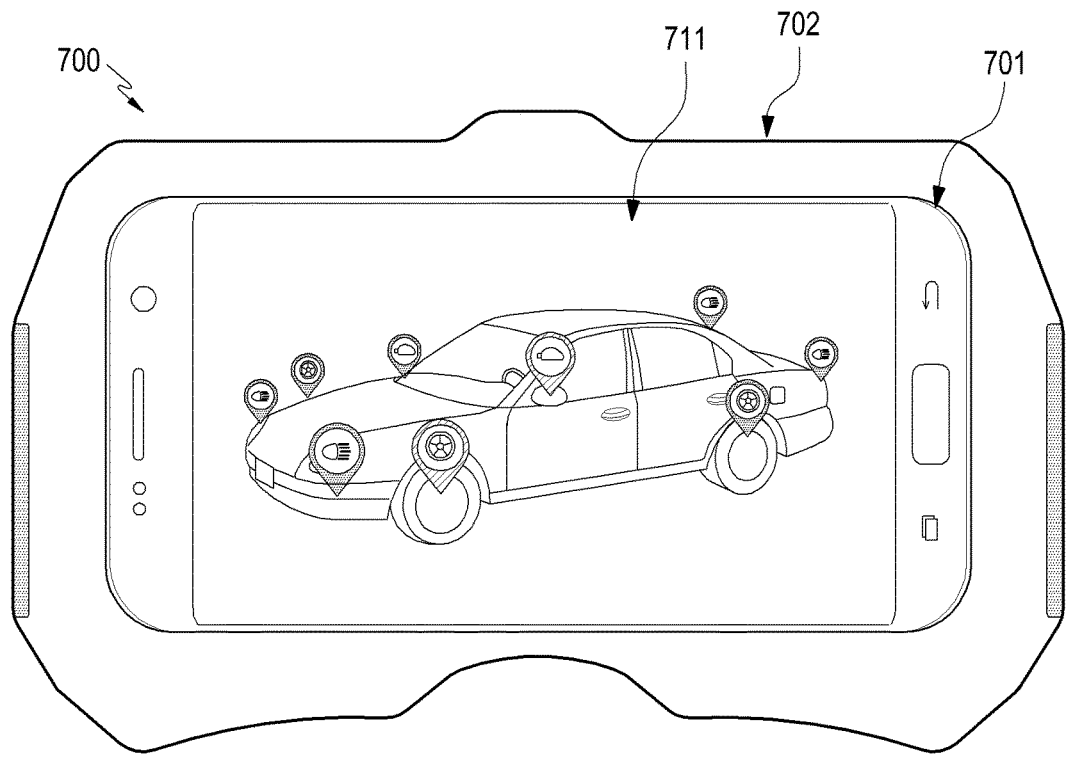

Referring to FIG. 7D, the VR enabled display unit 701 displays a digital representation 711 including graphical representations of transmitting devices and graphical representations of corresponding status information. The digital representation 711 is a virtual replica of the entire car.

In accordance with an embodiment, upon rendering the modified digital representation, the device 301 or the VR management module 308, enables controlling of the identified transmitting devices 316 via the modified digital representation. Accordingly, the VR enabled display unit 322 displays a digital representation including the graphical representations of the identified transmitting devices 316 and corresponding status information and/or location information. Such digital representation may be interchangeably referred to as modified digital representation hereinafter.

Thereafter, the input receiving unit 323 receives a user-input through the VR enabled input unit 325 on the modified digital representation. The user-input is indicative of control information of the identified transmitting device 316. The user-input may be in form of at least one of voice command, eye gaze, gesture input, touch input, motion of the VR enabled input unit 325, position of the VR enabled input unit 325, and spatial orientation the VR enabled input unit 325. The control information may be indicative of variation in a value of location information of the transmitting devices 316. The control information may also be indicative of variation in a value of at least one device parameter of the transmitting devices 316.

Accordingly, the user-input may be received in two parts. As such, the input receiving unit 323 receives a first user-input through the VR enabled input unit 325 indicative of selection of one of the identified transmitting devices 316. Upon receiving the first user-input, the control unit 324 fetches a graphical representation of a control panel associated with selected transmitting device 316 from the GR database 332. The GR database 332, as illustrated in FIG. 3E, includes a list 335 of pre-stored graphical representations of control panel (referred in FIG. 3E as GRCP 335) mapped with the corresponding device identifiers of the transmitting devices 316.

Upon fetching the graphical representation of the control panel, the control unit 324 renders the graphical representation of the control panel on a current view of the modified representation on the VR enabled display unit 306. To this end, the control unit 324 sends the graphical representation of the control panel and a corresponding command to the rendering unit 322 to render the graphical representation on the current view.

Upon rendering the control panel, the input receiving unit 323 receives second user-input through the VR enabled input unit. The second user-input is indicative of manipulating the graphical representation of the control panel. Based on the manipulation, the control unit 324 determines the control information. In an example, a control panel represents information as operation status being inactive/OFF for a smart vacuum cleaner on a digital representation of a real kitchen. In such example, the input receiving unit 323 receives second user-input as changing the operation status to active/ON. Accordingly, the control unit 324 determines the control information as 'activating/switching ON the transmitting device'.

Upon determining, the control unit 324 renders the control information on the current view of the digital representation. To this end, the control unit 324 fetches graphical representation corresponding to the control information from the list 334 of pre-stored graphical representations in the GR database 332. Upon fetching, the control unit 324 sends the graphical representations and a corresponding command to the rendering unit 322 to render the graphical representation on the current view.

Upon receiving the control information, the control unit 324 controls one or more operations of the transmitting devices 316 in the real world environment 317 in accordance with the control information. Accordingly, the control unit 324 transmits the control information to the selected transmitting device 316 in the real world environment 317 over the network 315. Upon receiving the control information, the selected transmitting device 316 transmits an acknowledgement message. Further, the control unit 324 transmits the control information to the status and location unit 321 to update SLI database 331 based on the control information.

Furthermore, status information and/or location information of the selected transmitting device 316 may change based on the control information. Accordingly, in one embodiment, the status and location unit 321 may obtain further status information or modified/changed status information of the selected transmitting device 316. In another embodiment, the status and location unit 321 may obtain further status information and real-time location of the selected transmitting device 316. The status and location unit 321 obtains the status information and the real-time location in a manner as described during synthesis of environment. In addition, as described earlier, the status and location unit 321 update SLI database 331.

Upon obtaining the further status information and/or the real-time location, the SDRU 319 fetches graphical representations of further status information from the list 321 of pre-stored graphical representations in the GR database 332.

Upon fetching, the SDRU 319 superimposes the graphical representation of further status information on the digital representation to modify the digital representation. In addition, the SDRU 319 may further map the graphical representations of further status information at the real time location, as described earlier. In one embodiment, the SDRU 319 superimposes the graphical representation on the current view of the digital representation. In the above example, the graphical representation indicative of 'activated' smart vacuum cleaner may be presented on the digital representation of the real kitchen itself. In another embodiment, the SDRU 319 superimposes the graphical representation on a different digital representation. In the above example, the graphical representation indicative of 'activated' smart vacuum cleaner may be presented on a new digital representation of the real kitchen such as left-side view of the kitchen.

Further, while viewing the digital representations, the device 301 enables the user to perform all other functions such calling, messaging, and emailing without interrupting the VR experience. As such, the SDRU 319 superimposes user-interfaces corresponding to the functions over the digital representations. In an example, a user-interface corresponding to incoming call is superimposed on a digital representation. The user-interface may include information pertaining to the incoming call and options to answer or reject the call. In another example, user-interface corresponding to messages or emails is superimposed on a digital representation. The user-interface may include information pertaining to the messages or emails and options to read, reply, and manage the messages or emails.

FIGS. 8A, 8B, 9A, 9B, 10A, 10B, 10C, 11A, 11B, 11C, 12A, and 12B illustrate various examples of controlling transmitting devices via a digital representation, in accordance with an embodiment of the present disclosure. In the examples, a display unit of the smart phone functions as the VR enabled display unit 322 and an HMD and/or the other devices such as smart gloves functions as a VR enabled input unit.

Figure 8A:
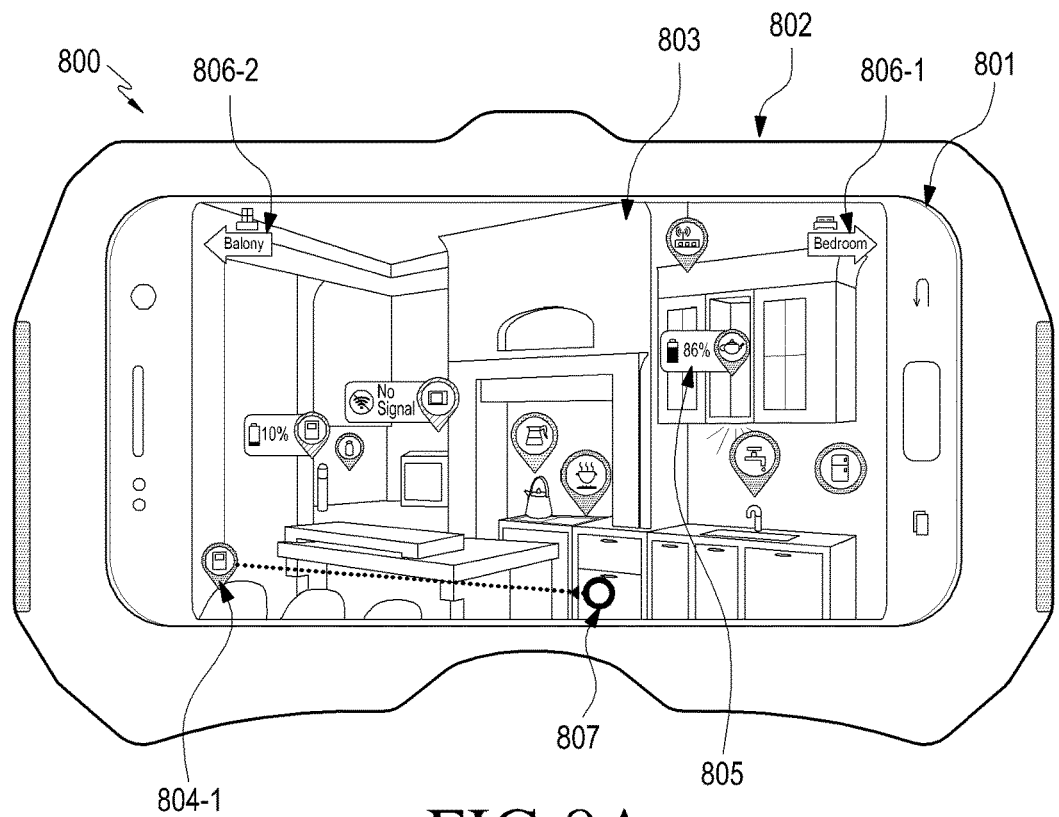
FIGS. 8A and 8B illustrate controlling transmitting devices through a digital representation, according to an embodiment of the present disclosure.
Figure 8B:
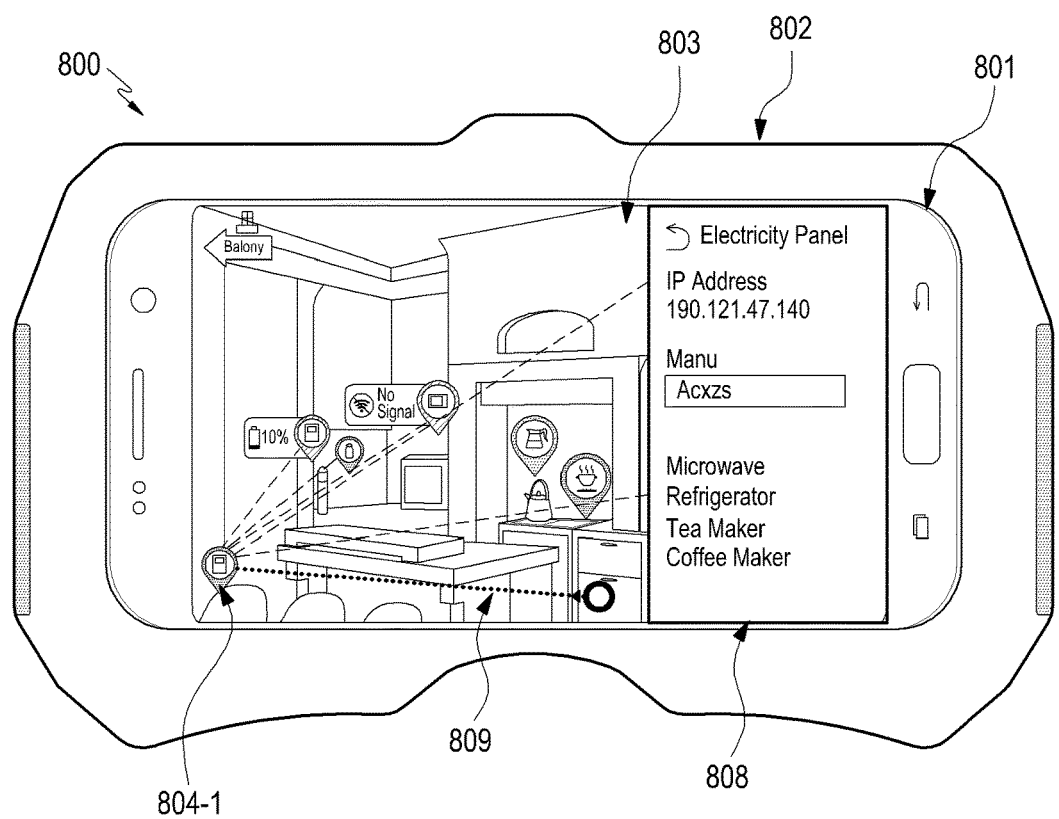

FIGS. 8A and 8B illustrate a first example 800 of controlling transmitting devices through digital representation, in accordance with another embodiment of the disclosure. In the example, a VR enabled display unit 801 displays a digital representation. HMD 802 and/or other VR enabled input units provide user-input. In the present example, an operation of the transmitting device is controlled to view further information.

The VR enabled display unit 801 displays a digital representation 803 corresponding to a front view of real world kitchen. The digital representation 803 includes graphical representation(s) 804 of transmitting device(s) and graphical representation(s) 805 of corresponding status information. The digital representation 803 further includes environment selection options 806-1 and 806-2 to enable selection of real world balcony and real world bedroom, respectively. The digital representation 803 further includes device selection option 807.

Referring to FIG. 8A, graphical representation 804-1 indicates smart electric panel or transmitting device. A selection of the smart electric panel is received via the device selection option 807 (represented by a dashed line connecting 804-1 and 807).

Referring to FIG. 8B, the control unit 324 provides a graphical representation 808 associated with a control panel of the smart electric panel in response to the selection. The graphical representation 808 provides status information and real-time location of the smart electric panel, as described above. The status information includes network address, manufacturer, and further transmitting devices connected with the smart electric panel such as smart oven, smart refrigerator, router, smart kettle, and smart coffee maker. Further, the control unit 324 provides graphical representation 809 (represented by dashed lines) to indicate active network connection between the connected devices.

Figure 9A:
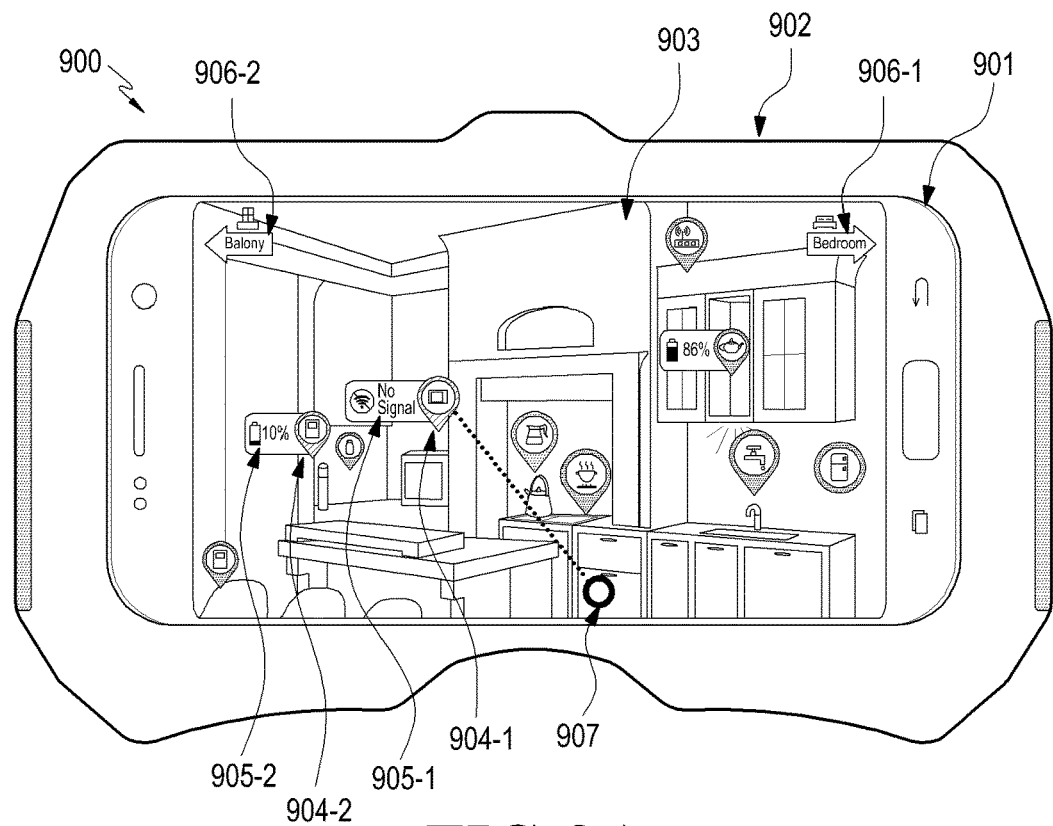
FIGS. 9A and 9B illustrate controlling transmitting devices through digital representations, according to an embodiment of the present disclosure.
Figure 9B:
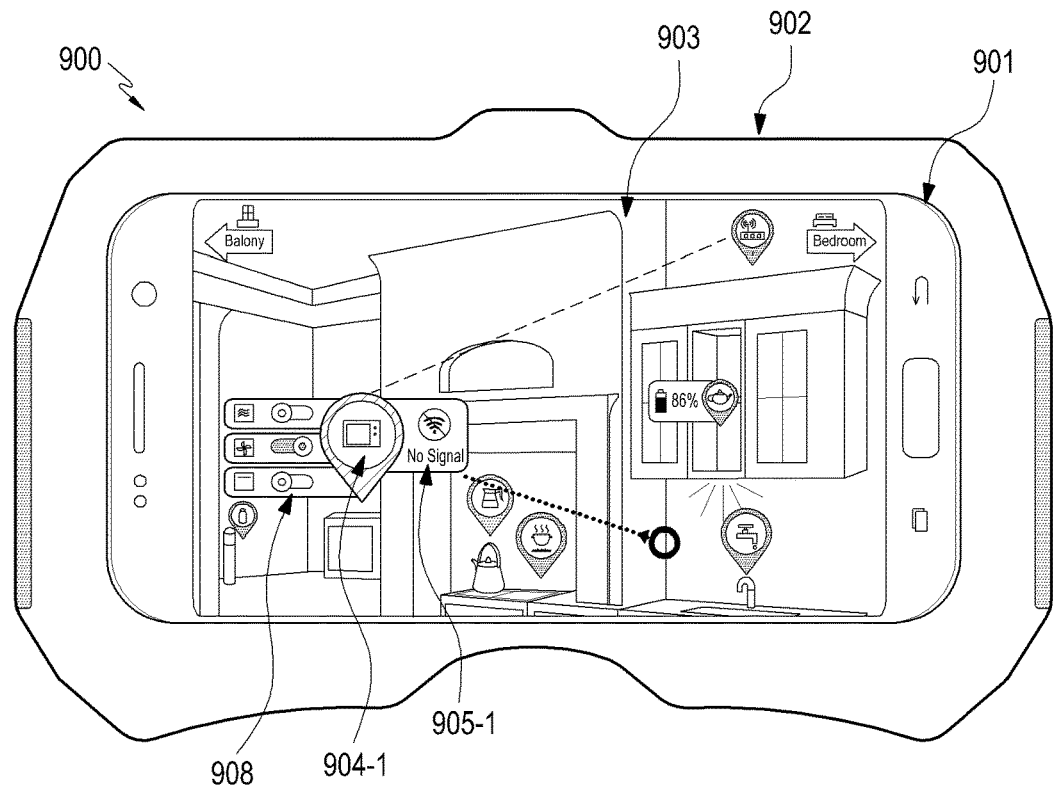

FIGS. 9A and 9B illustrate a second example 900 of controlling transmitting devices through digital representation, in accordance with another embodiment of the disclosure. In the example, a VR enabled display unit 901 displays a digital representation. HMD 902 and/or other VR enabled input units provide user-input. In the present example, an operation of the transmitting device is controlled to view further information and to change operating status.

The VR enabled display unit 901 displays a digital representation 903 corresponding to a front view of real world kitchen. The digital representation 903 includes graphical representation(s) 904 of transmitting device(s) and graphical representation(s) 905 of corresponding status information. The digital representation 903 further includes environment selection options 906-1 and 906-2 to enable selection of real world balcony and real world bedroom, respectively. The digital representation 903 further includes device selection option 907.

Referring to FIG. 9A, graphical representation 904-1 indicates smart oven or transmitting device and graphical representation 905-1 indicates 'no network connection' status information. Graphical representation 904-2 indicates smart grinder or transmitting device and graphical representation 905-1 indicates battery status as '10%'. A selection of the smart oven is received via the device selection option 905 (represented by a dashed line connecting 904-1 and 907).

Referring to FIG. 9B, the control unit 324 provides a graphical representation 908 associated with a control panel of the smart oven in response to the selection. The graphical representation 908 provides status information and real-time location of the smart oven, as described above. A change in operation status 906-1 from inactive/OFF to active/ON is received via the graphical representation 908. Accordingly, control information is determined and the graphical representation 905-1 is updated. The control information is further transmitted to the smart oven such that the smart oven becomes active to perform functions in the real world kitchen.

In a similar manner, two devices may be selected and corresponding status may be viewed. In an example, a selection of the smart oven and the smart grinder is received via the device selection option 907. Upon selection, the graphical representations associated with control panels of the smart oven and the smart grinder are displayed.

Figure 10A:
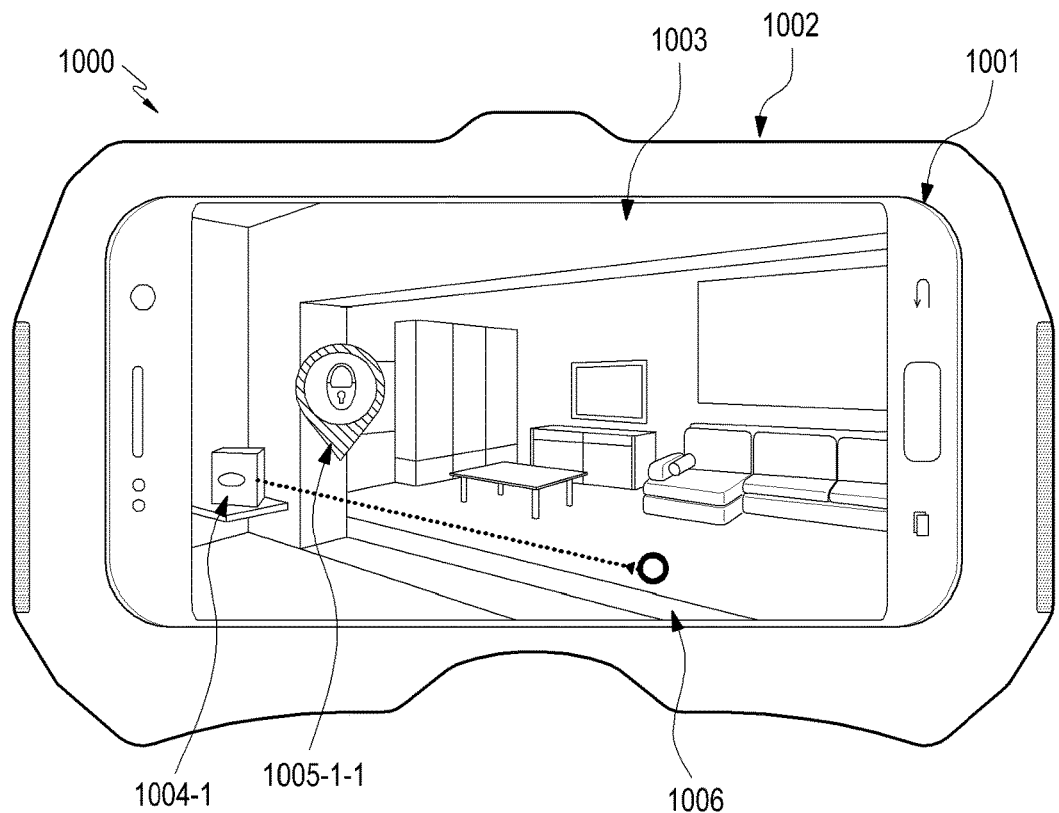
FIGS. 10A, 10B, and 10C illustrate controlling transmitting devices through a digital representation, according to an embodiment of the present disclosure.
Figure 10B:
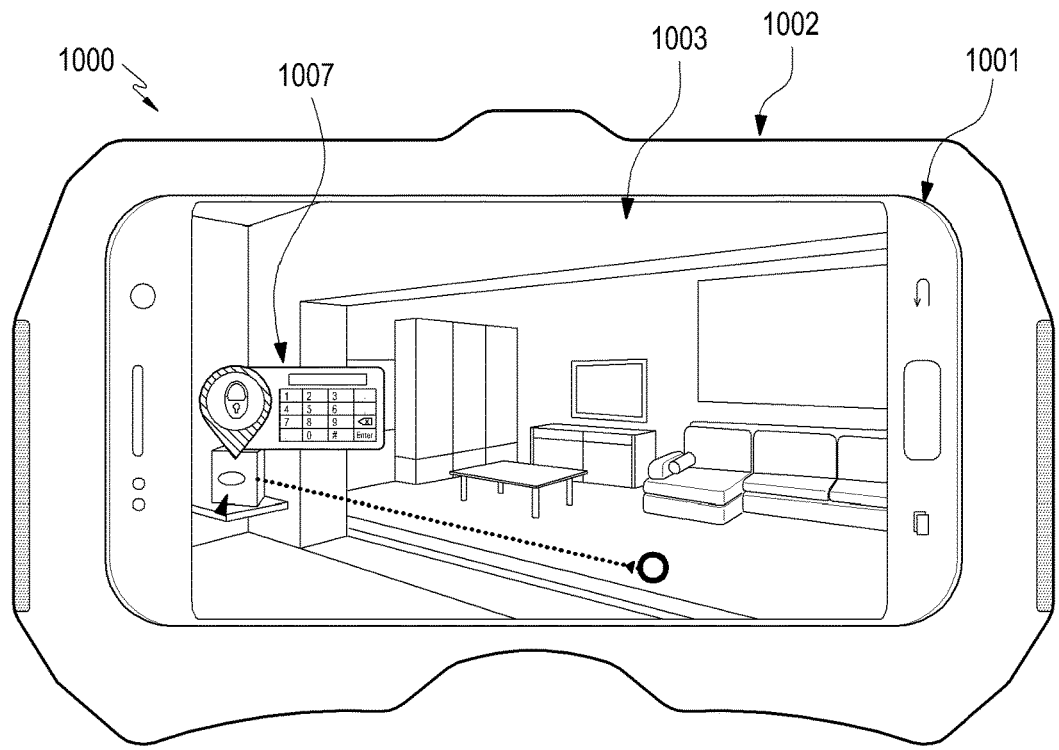
Figure 10C:
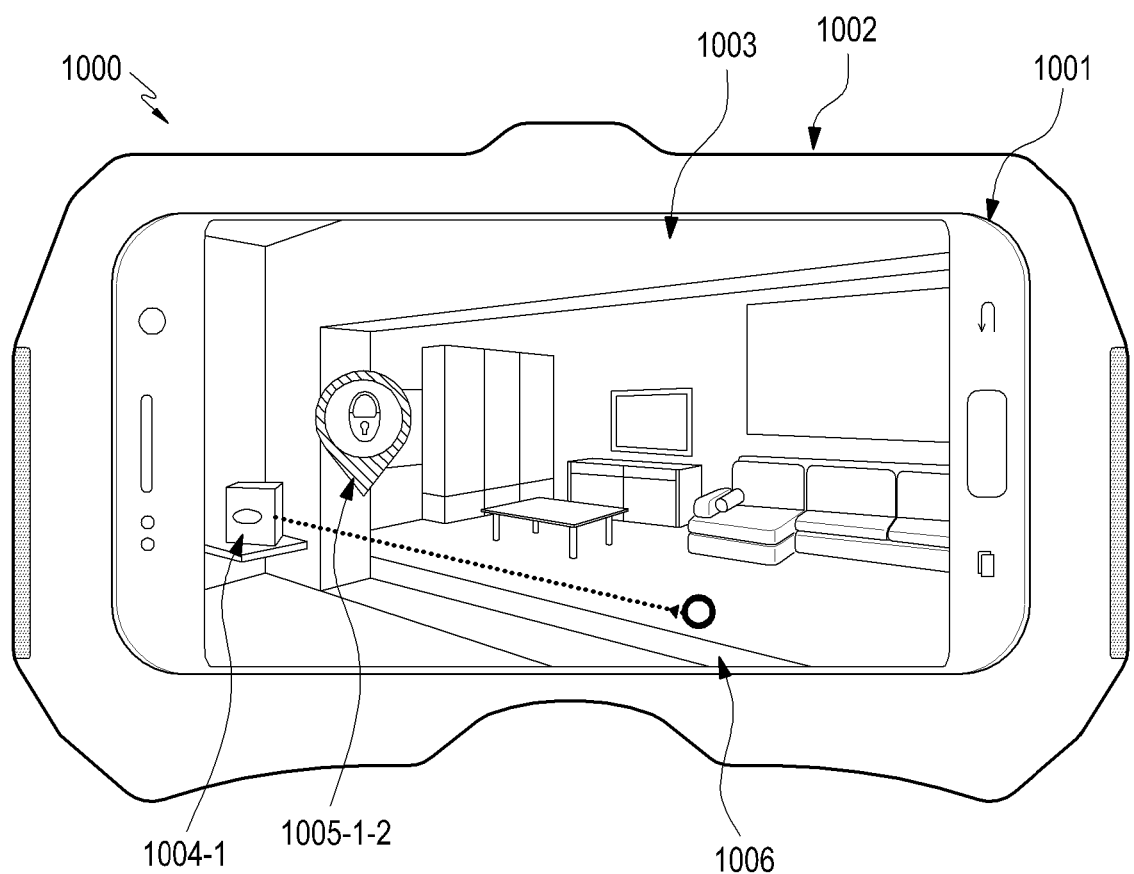

FIGS. 10A, 10B, and 10C illustrate a third example 1000 of controlling transmitting devices through digital representation, in accordance with another embodiment of the disclosure. In the example, a VR enabled display unit 1001 displays a digital representation. HMD 1002 and/or other VR enabled input units provide user-input. In the present example, an operation of the transmitting device is controlled to view further information and to change mode of operation.

The VR enabled display unit 1001 displays a digital representation 1003 corresponding to a front view of real world bedroom. The digital representation 1003 includes graphical representation(s) 1004 of transmitting device(s)

and graphical representation(s) 1005 of corresponding status information. The digital representation 1003 further includes device selection option 1006.

Referring to FIG. 10A, graphical representation 1004-1 indicates smart locker or transmitting device and graphical representation 1005-1-1 indicates mode of operation as 'locked' (represented by locked icon in circle). A selection of the smart locker is received via the device selection option 1006 (represented by a dashed line connecting 1004-1 and 1006).

Referring to FIG. 10B, the control unit 324 provides a graphical representation 1007 associated with a control panel of the smart locker in response to the selection. The graphical representation 1007 provides a key pad to enter authentication information such as a personal identification number (PIN) or password. Accordingly, the control unit 324 determines the control information or the authentication information and transmits the authentication information to the smart locker. Upon receiving the authentication information, the smart locker validates and unlocks itself. The smart locker then transmits updated status information as mode of operation being 'unlocked' to the status and location unit 321. Thereafter, the SDRU 319 modifies/updates the digital representation 1003 to include a graphical representation of updated the status information.

Referring to FIG. 10C, the VR enabled display unit 1001 displays the digital representation 1003 such that a graphical representation 1005-1-2 indicates mode of operation as 'unlocked' (represented by unlocked icon in circle).

Figure 11A:
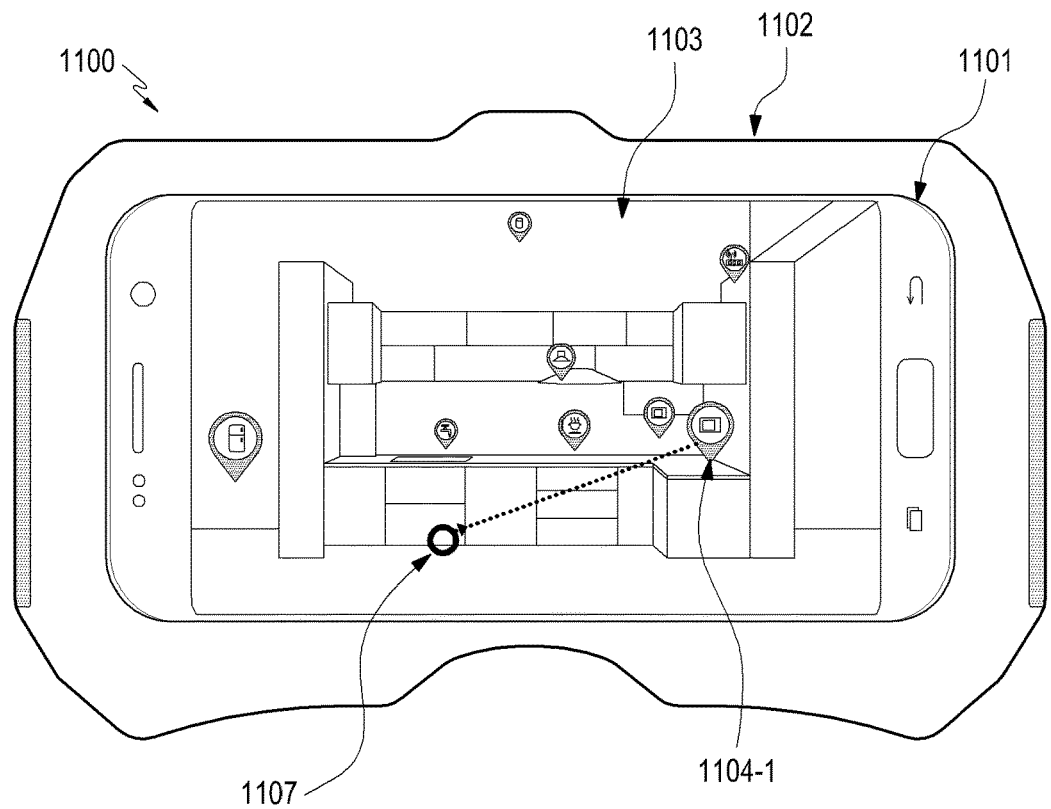
FIGS. 11A, 11B, and 11C illustrate controlling transmitting devices through digital representations, according to an embodiment of the present disclosure.
Figure 11B:
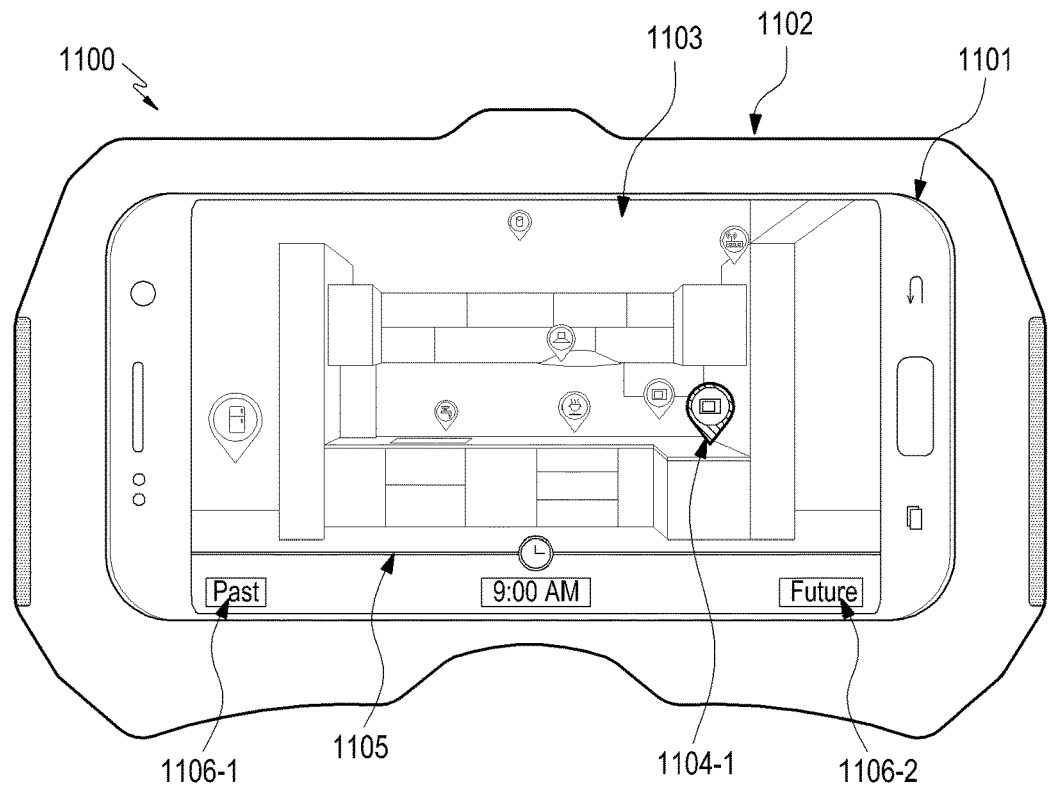
Figure 11C:
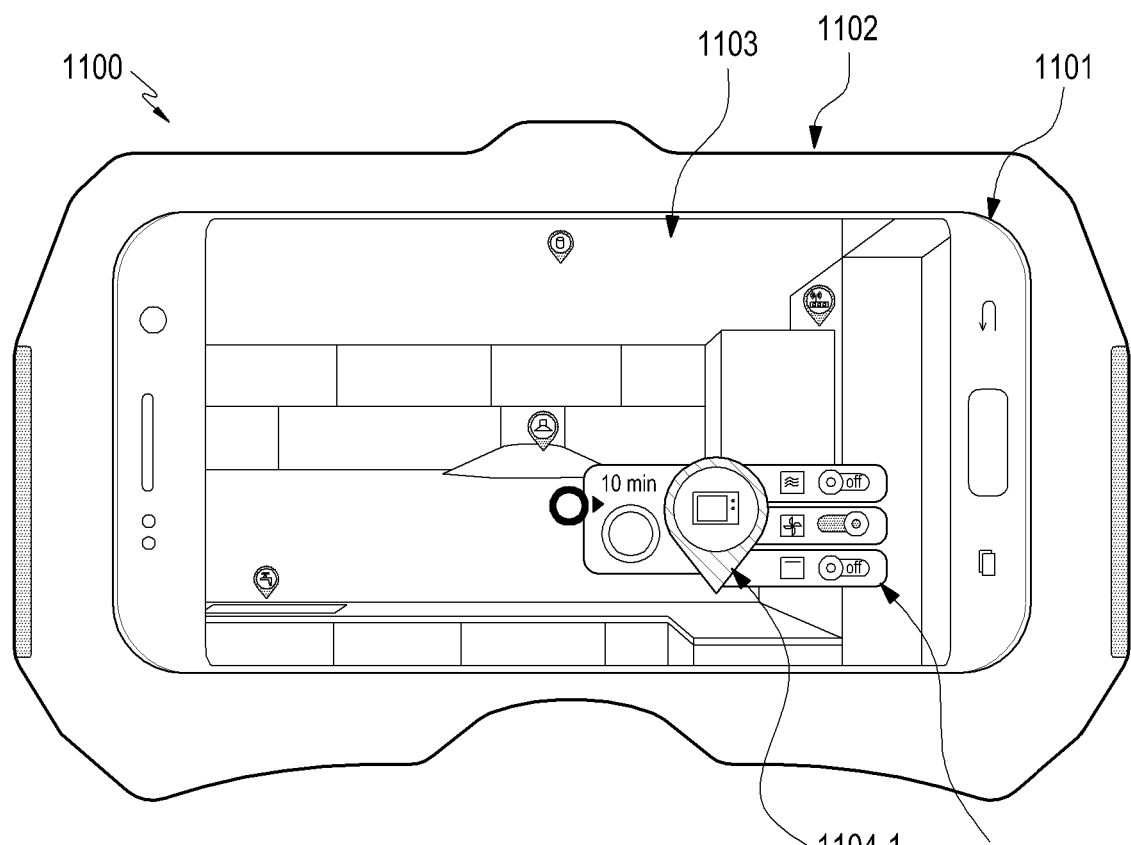

FIGS. 11A, 11B, and 11C illustrate a fourth example 1100 of controlling transmitting devices through digital representation, in accordance with another embodiment of the disclosure. In the example, a VR enabled display unit 1101 displays a digital representation. HMD 1102 and/or other VR enabled input units provide user-input. In the present example, an operation of the transmitting device is controlled to change mode of operation for future time.

The VR enabled display unit 1101 displays a digital representation 1103 corresponding to a front view of real world bedroom. The digital representation 1103 includes graphical representation(s) 1104-1 of transmitting device(s). For the sake of brevity, graphical representation(s) of corresponding status information and environment selection options are not illustrated. The digital representation 1103 further includes time progress bar 1105 to display time such as current time, past time, and future time. The digital representation 1103 further includes time selection options 1106-1 and 1106-2 in FIG. 11B to select time such as past time and future time. The digital representation 1103 further includes device selection option 1107 in FIG. 11A.

Referring to FIG. 11A, graphical representation 1104-1 indicates smart oven or transmitting device. A selection of the smart oven is received via the device selection option 1107 (represented by a dashed line connecting 1104-1 and 1107).

Referring to FIG. 11B, upon selection, the control unit 324 displays the time progress bar 1105 indicating current time 9:00 AM on the digital representation 1103.

Referring to FIG. 11C, upon selection of a future time 2:00 PM on the time progress bar 1105, the control unit 324 displays a graphical representation 1108 of a control panel associated with the smart oven. As the selection corresponds to the future time, the graphical representations of other transmitting devices are either removed or shown in different colour. Through the graphical representation 1108, a change in mode of operation as 'heating' for 10 minutes is received. Accordingly, the control unit 324 determines and transmits control information to the smart oven. Upon receiving the control information, the smart oven sets a counter to operate at 2:00 PM for 10 minutes in heating mode. Consequently, the smart oven shares updated status information based on the control information at 2:00 PM and after 10 minutes with the status and location unit 321. Thereafter, the SDRU 319 modifies the digital representation 1103 to include a graphical representation of updated the status information.

Figure 12A:
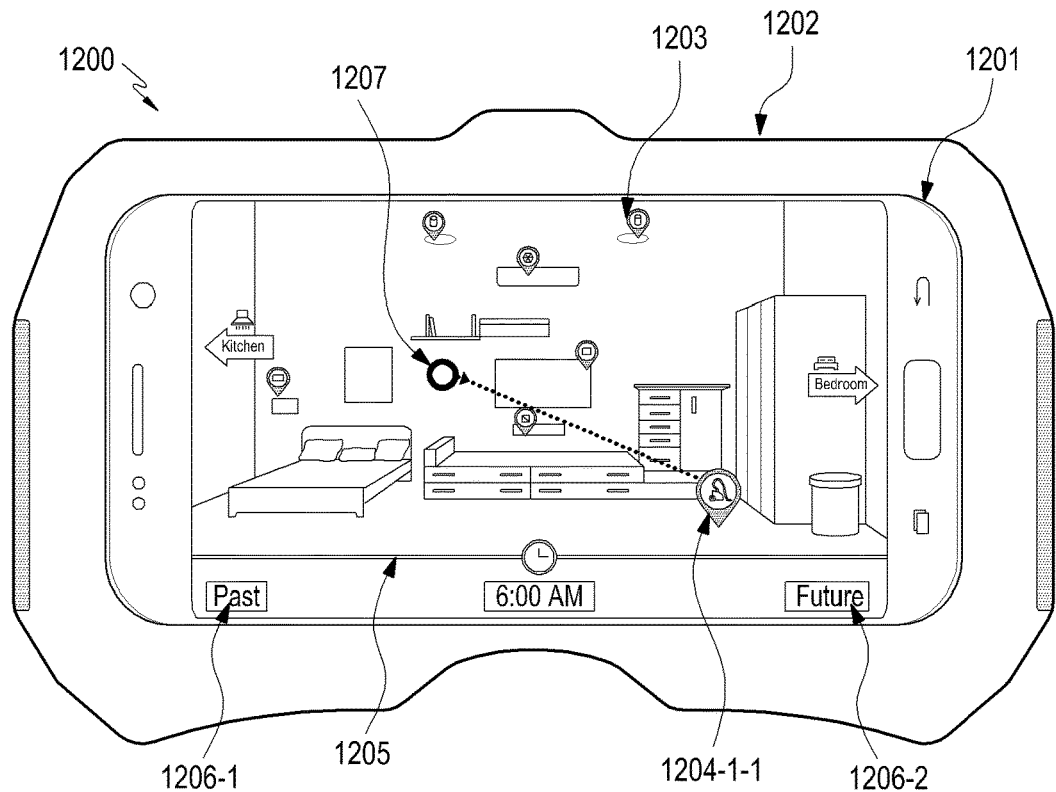
FIGS. 12A and 12B illustrate controlling transmitting devices through a digital representation, according to an embodiment of the present disclosure.
Figure 12B:
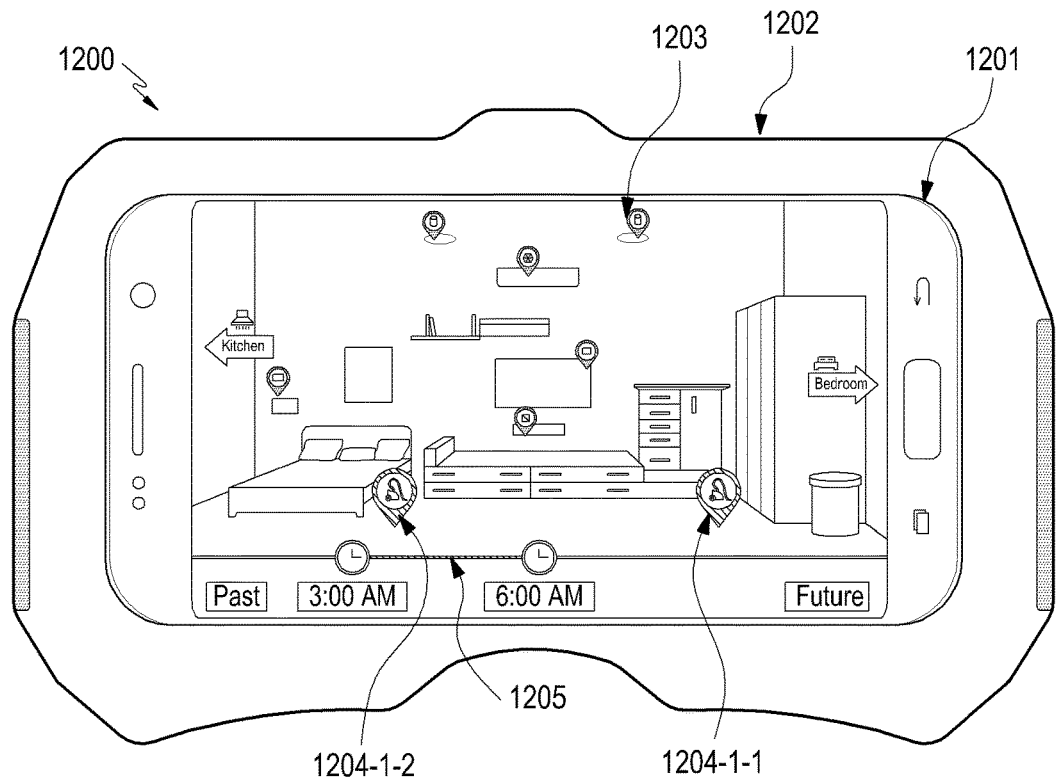

FIGS. 12A and 12B illustrate a fifth example 1200 of controlling transmitting devices through digital representation, in accordance with another embodiment of the disclosure. In the example, a VR enabled display unit 1201 displays a digital representation. HMD 1202 and/or other VR enabled input units provide user-input. In the present example, an operation of the transmitting device is controlled to view/access status of a transmitting device in past time.

The VR enabled display unit 1201 displays a digital representation 1203 corresponding to a front view of real world living room. The digital representation 1203 includes graphical representation(s) 1204-1-1 & 1204-1-2 of transmitting device(s). For the sake of brevity, graphical representation(s) of corresponding status information and environment selection options are not illustrated. The digital representation 1203 further includes time progress bar 1205 to display time such as current time, past time, and future time. The digital representation 1203 further includes time selection options 1206-1 and 1206-2 in FIG. 12A to select time such as past time and future time. The digital representation 1203 further includes device selection option 1207.

Referring to FIG. 12A, graphical representation 1204-1-1 indicates smart vacuum cleaner or transmitting device. A selection of the smart vacuum cleaner is received via the device selection option 1207 (represented by a dashed line connecting 1204-1 and 1207). Upon selection, the control unit 324 displays the time progress bar 1205 indicating current time 6:00 PM on the digital representation 1103. Thus, the graphical representation 1204-1-1 indicates current location and status of the smart vacuum cleaner at the current time, 6:00 PM.

Referring to FIG. 12B, upon selection of a past time 3:00 PM on the time progress bar 1205, the control unit 324 determines control information as to identify location and/or status at the selected time, 3:00 PM. The control unit 324 then transmits the control information to the status and location unit 321. The status and location unit 321 then fetches status information and/or location information from the SLI database 310 corresponding to the time 3:00 PM. Thereafter, the SDRU 319 fetches graphical representations corresponding to the fetched status and/or location information from the GR database 332, as described above. The SDRU 319 then modifies the digital representation 1203 to include a graphical representation 1204-1-2 of past the status information and/or location information along with the graphical representation 1204-1-1 and corresponding time. Thus, the graphical representation 1204-1-2 indicates location and status of the smart vacuum cleaner at the past time, 3:00 PM. This enables viewing of status and/or location for both past and current times simultaneously.

Thus, the disclosure enables viewing of control information of the transmitting devices. Further, the disclosure enables controlling of the transmitting devices through the digital representation. This provides an ease of controlling as the user is not required to physically present to operate the transmitting devices, thereby considerably improving the user-experience.

Figure 13A:
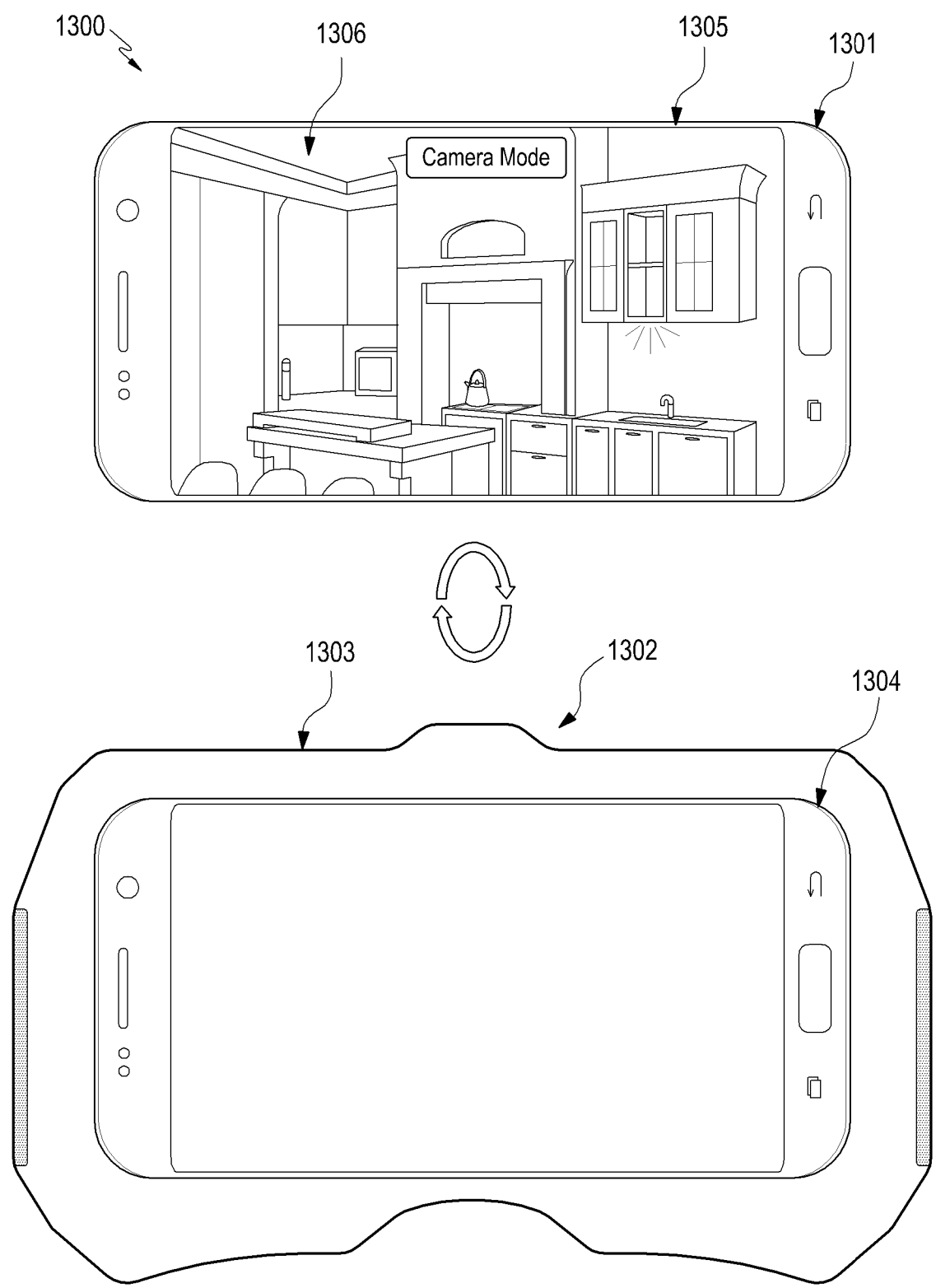
FIGS. 13A, 13B, 13C, and 13D illustrate controlling transmitting devices through a digital representation obtained from an external device, according to embodiment of the present disclosure.
Figure 13B:
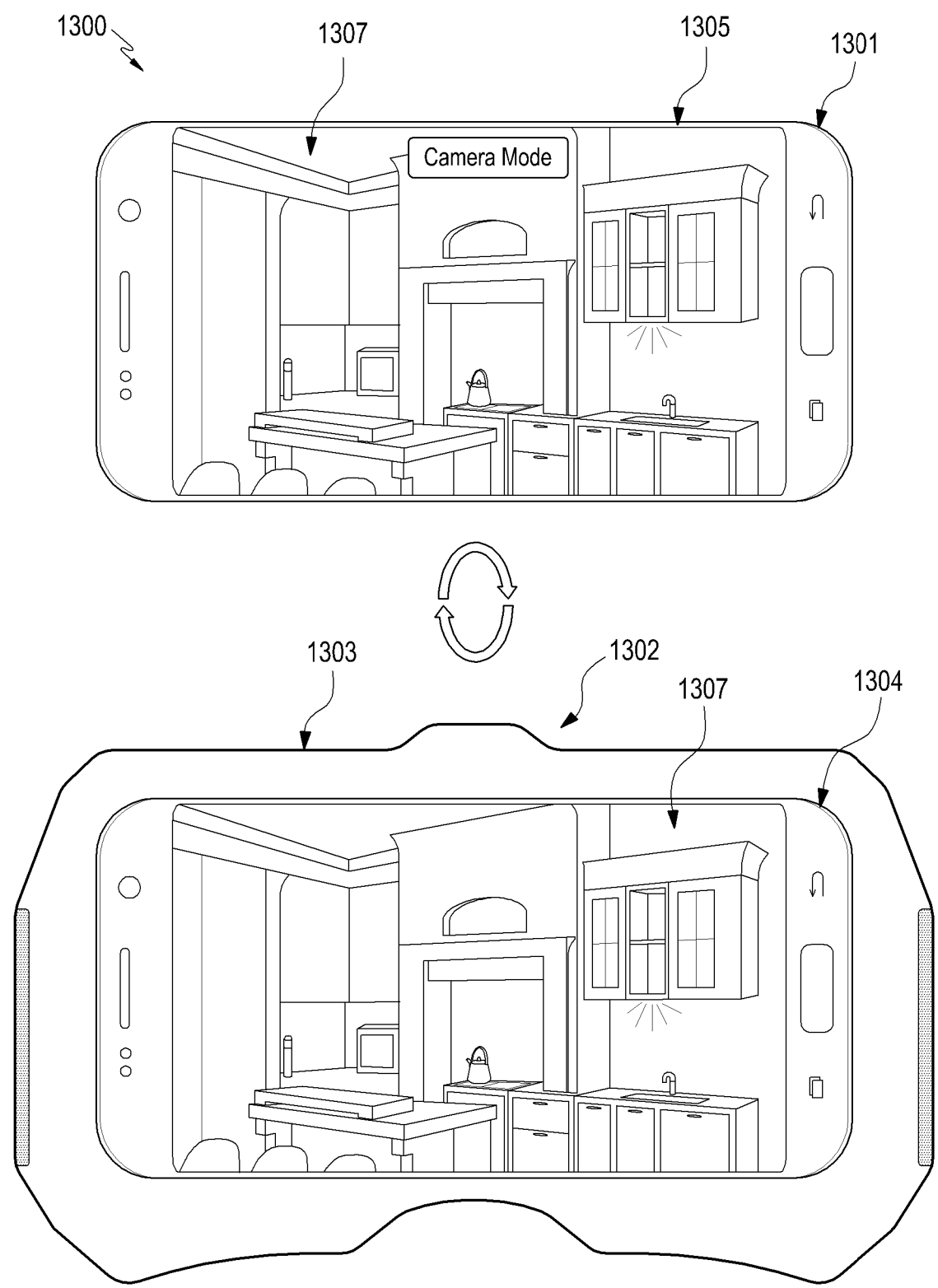
Figure 13C:
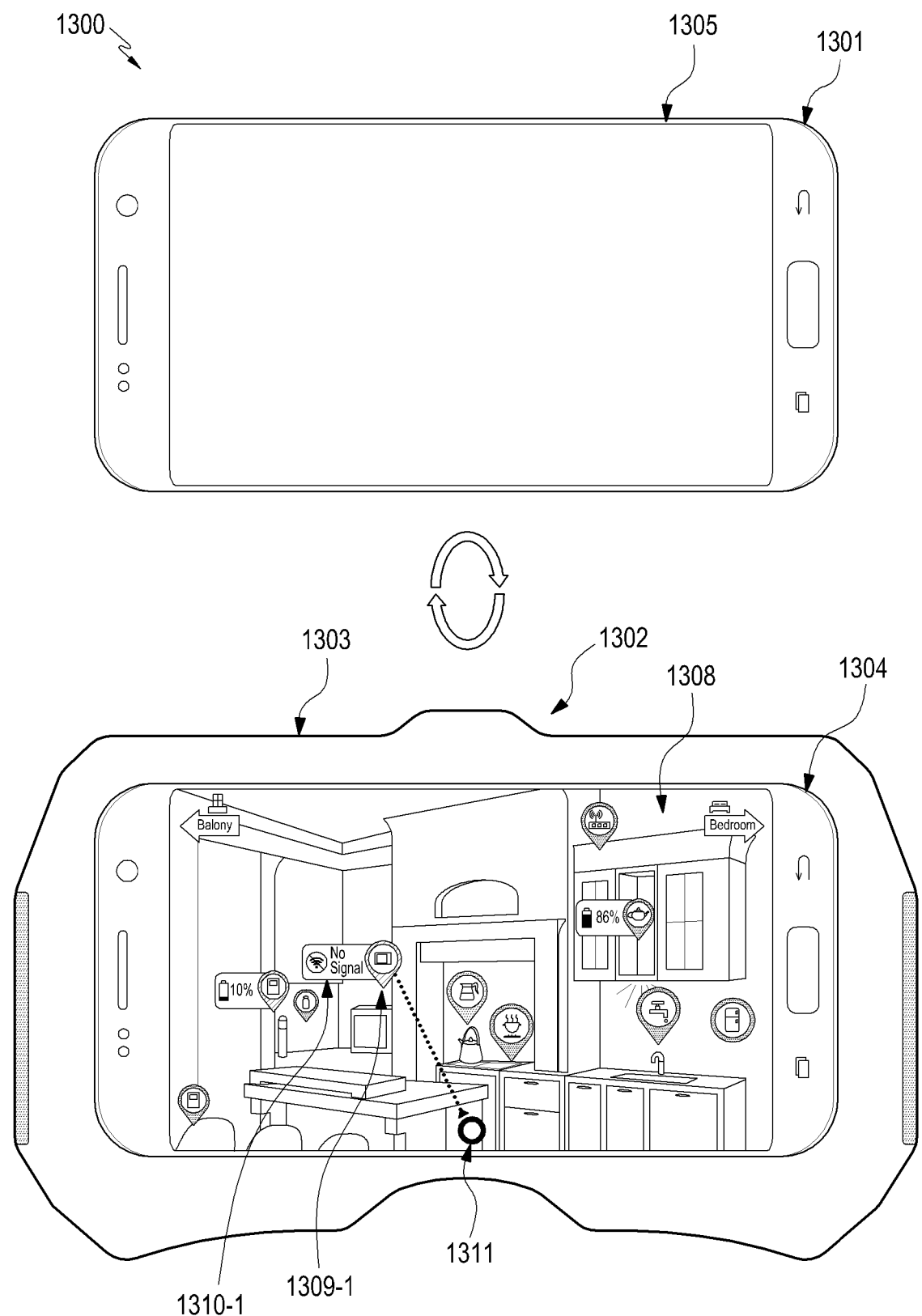

FIGS. 13A, 13B, and 13C illustrate an example 1300 of viewing and controlling transmitting devices through a digital representation obtained from an external device, in accordance with another embodiment of the present disclosure. In the example, a first electronic device 1301 is communicatively coupled with a second electronic device 1302 over a network (represented by a sync icon). A user of the first electronic device 1301 is currently present in a real world kitchen. A user of the second electronic device 1302 is currently present in a real world office.

Further, the second electronic device 1302 includes components and/or access databases as described above with reference to FIGS. 3A, 3B, 3C, 3D, and 3E. As such, the second electronic device 1302 includes a VR enabled display unit 1303 to display a digital representation and a HMD 1304 and/or other VR enabled input units to provide user-input. For the sake of brevity only the VR enabled display unit and the HMD are illustrated. The first electronic device 1301 includes a display unit 1305, an image capturing unit, and other unit(s) as necessary. For the sake of brevity, only the display unit is illustrated.

Referring to FIG. 13A, the first electronic device 1301 displays a real image 1306 of a front view of the real world kitchen in a camera mode on the display unit 1305. For the sake of brevity, the second electronic device 1302 is illustrated to be in screen-off state (represented by blank screen).

Referring to FIG. 13B, the first electronic device 1301 captures a digital representation 1307, as described in FIG. 4A, of the real world kitchen in real time using the image-capturing unit. The first electronic device 1301 captures the digital representation 1307 upon receiving a corresponding user-input, as described above with reference to FIG. 3B.

The first electronic device 1301 further creates metadata corresponding to the digital representation 1307. The metadata includes location information and identification information of the real world kitchen, and location information of transmitting devices available in proximity to the location information of the image-capturing unit or the first electronic device 1301. The first electronic device 1301 transmits the digital representation 1307 and the metadata to the second electronic device 1302 over the network as known in the art.

Upon receiving the digital representation 1307, the VR enabled display unit 1303 displays the digital representation 1307. The input receiving unit receives a user-input via the HMD 1304 and/or other VR enabled input units. The user-input is indicative of a selection of an option to view transmitting devices available in the digital representation 1307 or in the real world kitchen.

Referring to FIG. 13C, upon receiving the user-input, the VR enabled display unit 1303 displays a modified digital representation 1308 in a manner as described above with reference to FIGS. 3B, 3D, and 3E. The modified digital representation 1308 includes graphical representation(s) 1309 of identified transmitting device(s) and graphical representation(s) 1310 of corresponding status information. As illustrated, graphical representation, 1309-1 indicates smart oven or transmitting device and graphical representation 1310-1 indicates 'no network connection' status information. The modified digital representation 1308 further includes device selection option 1311. A selection of the smart oven is received via the device selection option 1311 (represented by a dashed line connecting 1309-1 and 1311). For the sake of brevity, the first electronic device 1301 is illustrated to be in screen-off state (represented by blank screen) upon transmitting the digital representation 1307.

Figure 13D:
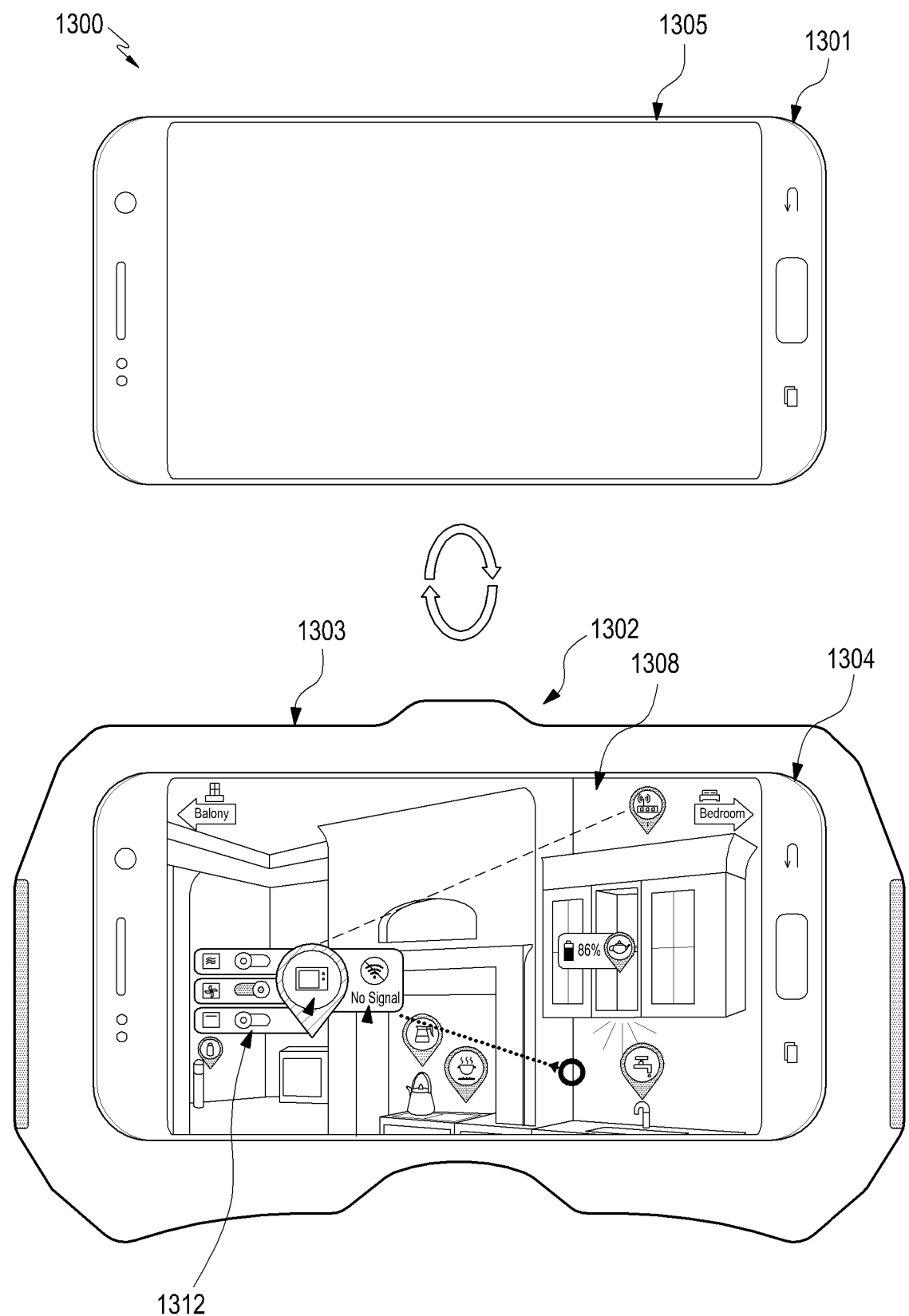

Referring to FIG. 13D, the VR enabled display unit 1303 displays a graphical representation 1312 associated with a control panel of the smart oven in response to the selection, as described above with reference to FIGS. 3B, 3D, and 3E. The smart oven may be controlled in the real world kitchen by providing control information via the graphical representation 1312, as described above with reference to FIGS. 3B, 3D, and 3E. The control information is further transmitted to the smart oven such that the smart oven becomes active to perform functions in the real world kitchen. For the sake of brevity, the first electronic device 1301 is illustrated to be in screen-off state (represented by blank screen) upon transmitting the digital representation 1307.

Figure 14:
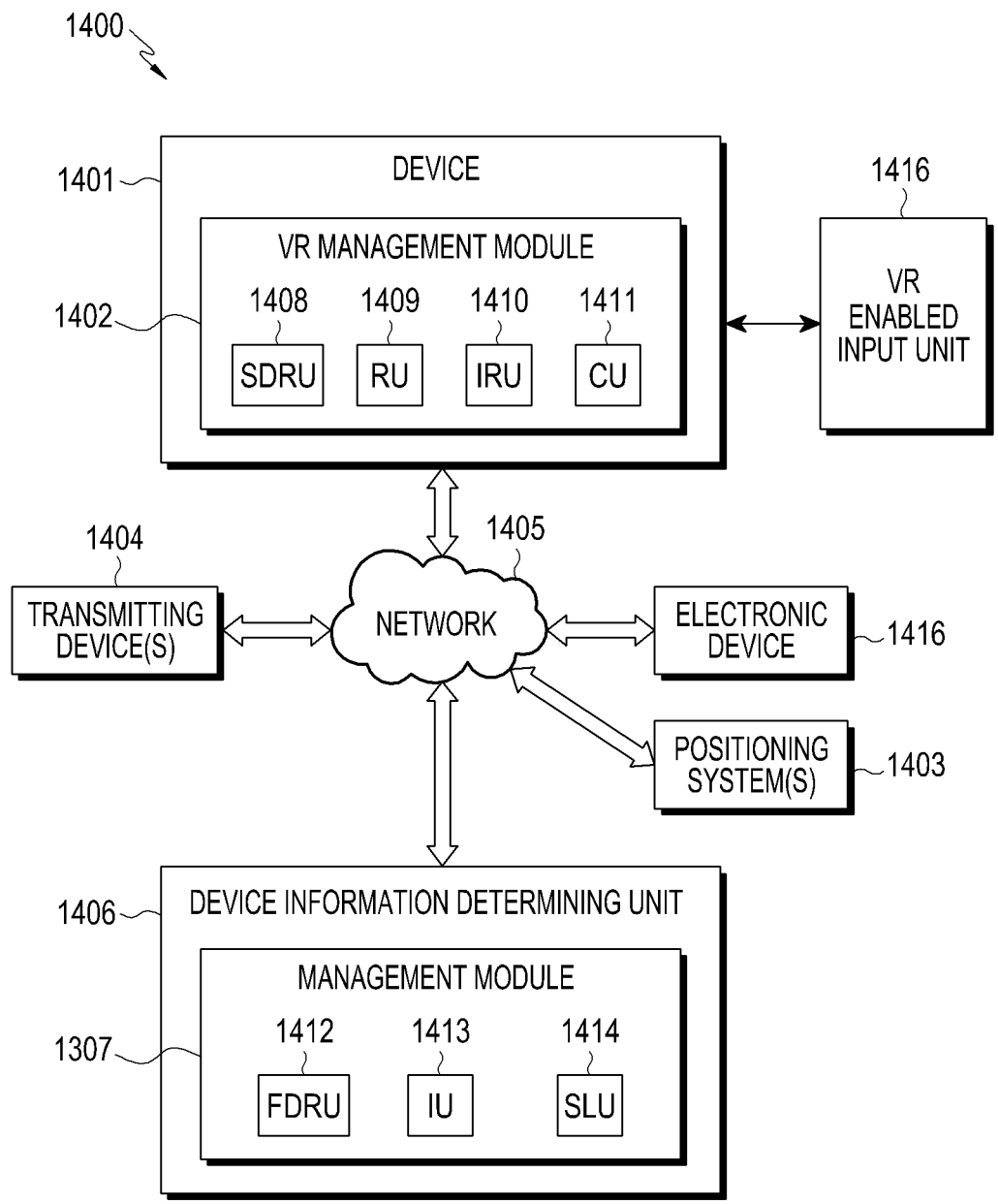
FIG. 14 is a block diagram of a distributed processing network environment that includes an electronic device, according to an embodiment of the present disclosure.

FIG. 14 is a block diagram of a distributed processing network environment 1400 that includes an electronic device 1401 according to an embodiment of the present disclosure.

Referring to FIG. 14, the electronic device 1401 may be the electronic device 301 illustrated in FIGS. 3A and 3B. The electronic device 1401 may include a bus, a processor, a memory, an input/output (I/O) interface, a VR enabled display unit, a communication interface, and a virtual reality (VR) management module 1402, as illustrated in FIG. 3A. For the sake of brevity, only the VR management module 1402 has been illustrated.

The electronic device 1401 is communicatively coupled with positioning system(s) 1403 and transmitting device(s) 1404 the over a network 1405, as described in FIG. 3B. The electronic device 1401 enables controlling of transmitting device(s) 1404 in a real world environment through VR. To this end, in the distributing processing network environment 1400, as described earlier, another electronic device, or a plurality of electronic devices, may perform some of the operations performed by the electronic device 1401. Accordingly, the electronic device 1401 is communicatively coupled with a device information determining unit 1406, an external device, over the network 1405.

The device information determining unit 1406 may include a bus, a processor, a memory, an input/output (I/O) interface, a display unit, a communication interface, and a management module 1407. For the sake of brevity, only the management module 1407 has been illustrated. Further, the electronic device 1401 and the device information determining unit 1406 are communicatively coupled with a digital representations (DR) database, a status and location information (SLI) database, and a graphical representation (GR) database, as illustrated and described in reference to FIG. 3b. For the sake of brevity, the databases have not been illustrated.

In accordance with an embodiment of the present disclosure, the electronic device 1401 in conjunction with the device information determining unit 1406 enables viewing and controlling of transmitting devices through VR. Accordingly, the VR management module 1402 in the electronic device 1402 includes a second digital representation unit (SDRU) 1408, a rendering unit (RU) 1409, an input receiving unit (IRU) 1410, and a control unit (CU) 1411. Further, the management module 1407 of the device information determining unit 1406 includes a first digital representation unit (FDRU) 1412, identification unit (IU) 1413, and a status and location unit (SLU) 1414.

In accordance with one embodiment of the present disclosure, the electronic device 1401 or specifically the VR management module 1402 synthesizes a digital environment of real world environment. Accordingly, the input receiving unit 1410 receives a user-input from a VR enabled input-receiving unit 1415 to synthesize a digital representation of the real world environment. Based on the user-input, the FDRU 1412 obtains a digital representation of the real world environment, as described above with reference to FIG. 3A. In an example, the FDRU 1412 obtains the digital representation of the real world environment when the electronic device 1401 captures an image of the real world environment, as described above with reference to FIGS. 5A and 5B. In another example, the FDRU 1412 obtains the digital representation of the real world environment when the electronic device 1401 receives an image of the real world environment from an external electronic device 1416 over the network 1405, as described above with reference to FIGS. 13A and 13B.

Upon obtaining the digital representation, the identification unit 1413 identifies the transmitting device(s) 1404 from the digital representation and subsequently, the status and location unit 1414 obtains at least one of status information and location information of identifies the transmitting device(s) 1404, as described above with reference to FIG. 3B. Upon receiving the status information and/or location information, the SDRU 1408 creates and renders a modified digital representation of the real world environment on the display unit. The modified digital representation includes a graphical representation of said identified transmitting device(s) 1404 in conjunction with the status information and/or location information, as described above with reference to FIG. 3B.

Further, upon rendering the modified digital representation, the input receiving unit 1410 receives a user-input on the modified digital representation from the VR enabled input unit 1415. The user-input is indicative of control information corresponding to selected transmitting device(s) on the modified digital representation. Upon receiving the control information, the control unit 1411 transmits the control information to the selected transmitting device(s) to control their operation, as described above with reference to FIG. 3B. Thereafter, the status and location unit 1414 obtains updated status information and/or location information of the selected transmitting device(s) in accordance with the control information, as described above with reference to FIG. 3B. Based on the updated status information and location information, SDRU 1408 modifies/updates and renders the modified digital representation on the display unit, as described above with reference to FIG. 3B.

Figure 15:
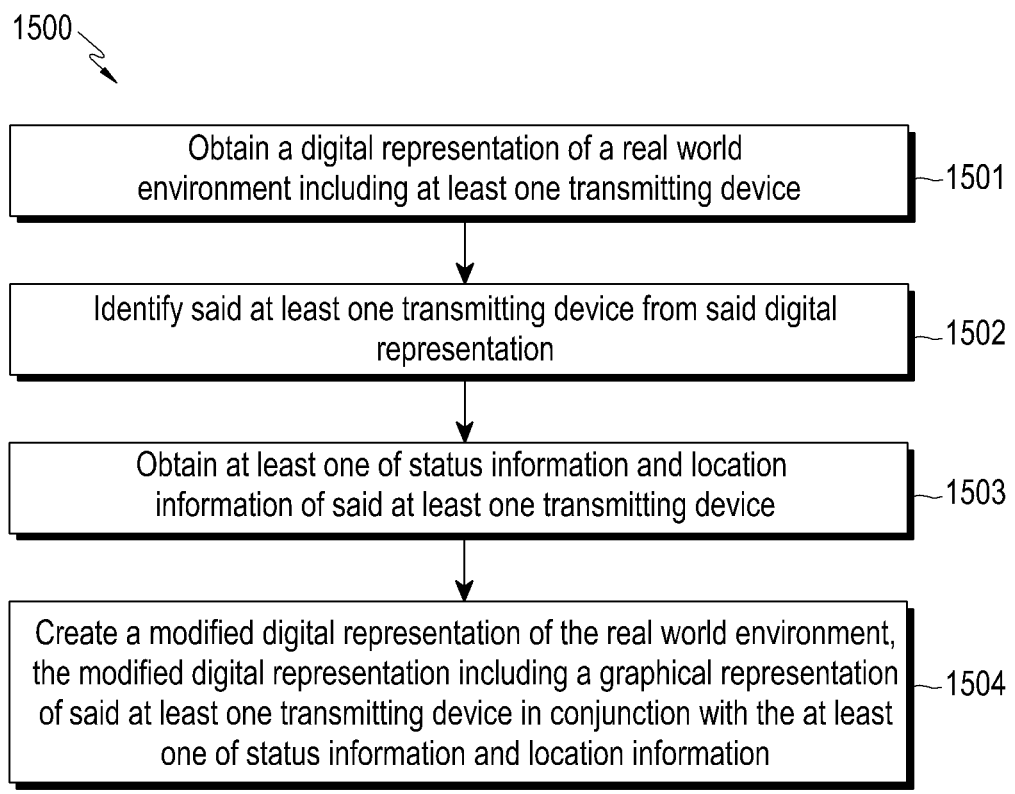
FIG. 15 is a flowchart of a method for synthesizing a digital representation of an environment for viewing transmitting devices, according to an embodiment of the present disclosure.

FIG. 15 is a flowchart of a method 1500 for synthesizing digital representation of an environment for viewing transmitting devices, in accordance with one embodiment of the present disclosure. The order in which the method is described is not intended to be construed as a limitation, and any number of the described method blocks may be combined in any order to implement the method, or an alternative method. Additionally, individual blocks may be deleted from the method without departing from the spirit and scope of the subject matter described herein. Furthermore, the method may be implemented in any suitable hardware, software, firmware, or combination thereof Referring to FIG. 15, at step 1501, a digital representation of a real world environment is obtained. The digital representation includes at least one transmitting device. For example, the FDRU 318 obtains the digital representation.

At step 1502, said at least one transmitting device is identified from said digital representation. For example, the identification unit 320 identifies the transmitting devices 316 from the digital representation.

At step 1503, at least one of status information and location information of said at least one transmitting device is obtained. For example, the status and location unit 321 obtains the status information and/or the location information of the transmitting devices 316.

At step 1504, a modified digital representation of the real world environment is created. The modified digital representation includes a graphical representation of said at least one transmitting device in conjunction with the at least one of status information and location information. For example, the SDRU 319 creates the modified digital representation.

Figure 16:
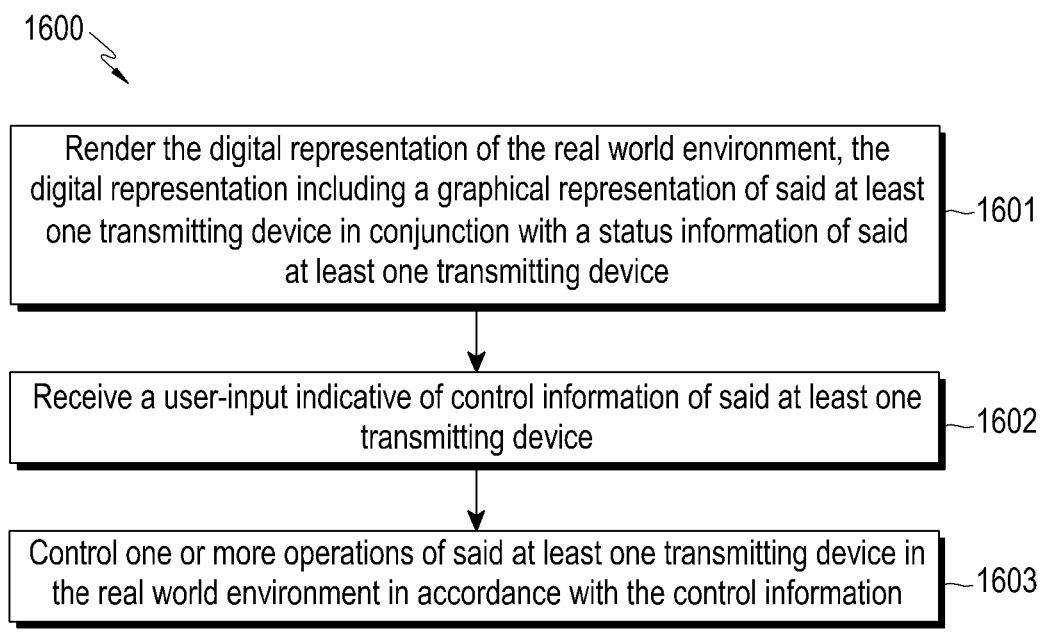
FIG. 16 is a flowchart of a method for controlling transmitting devices through a digital representation, according to an embodiment of the present disclosure.

FIG. 16 is a flowchart of a method 1600 for controlling the transmitting devices through the digital representation, in accordance with another embodiment of the present disclosure. The order in which the method is described is not intended to be construed as a limitation, and any number of the described method blocks may be combined in any order to implement the method, or an alternative method. Additionally, individual blocks may be deleted from the method without departing from the spirit and scope of the subject matter described herein. Furthermore, the method may be implemented in any suitable hardware, software, firmware, or combination thereof.

Referring to FIG. 16, at step 1601, the digital representation of the real world environment is rendered on a virtual reality (VR) enabled display unit. The digital representation includes a graphical representation of said at least one transmitting device in conjunction with a status information of said at least one transmitting device. For example, the rendering unit 322 renders the digital representation on the VR enabled display unit 306.

At step 1602, a user-input is received through a VR enabled input unit. The user-input is indicative of control information of said at least one transmitting device. For example, the input receiving unit 323 receives the user-input from the VR enabled input unit 325.

At step 1603, one or more operations of said at least one transmitting device in the real world environment are controlled in accordance with the control information. For example, the control unit 324 transmits the control information to the transmitting device 316 to modify operation of the transmitting device 316 in accordance with the control information.

Figure 17:
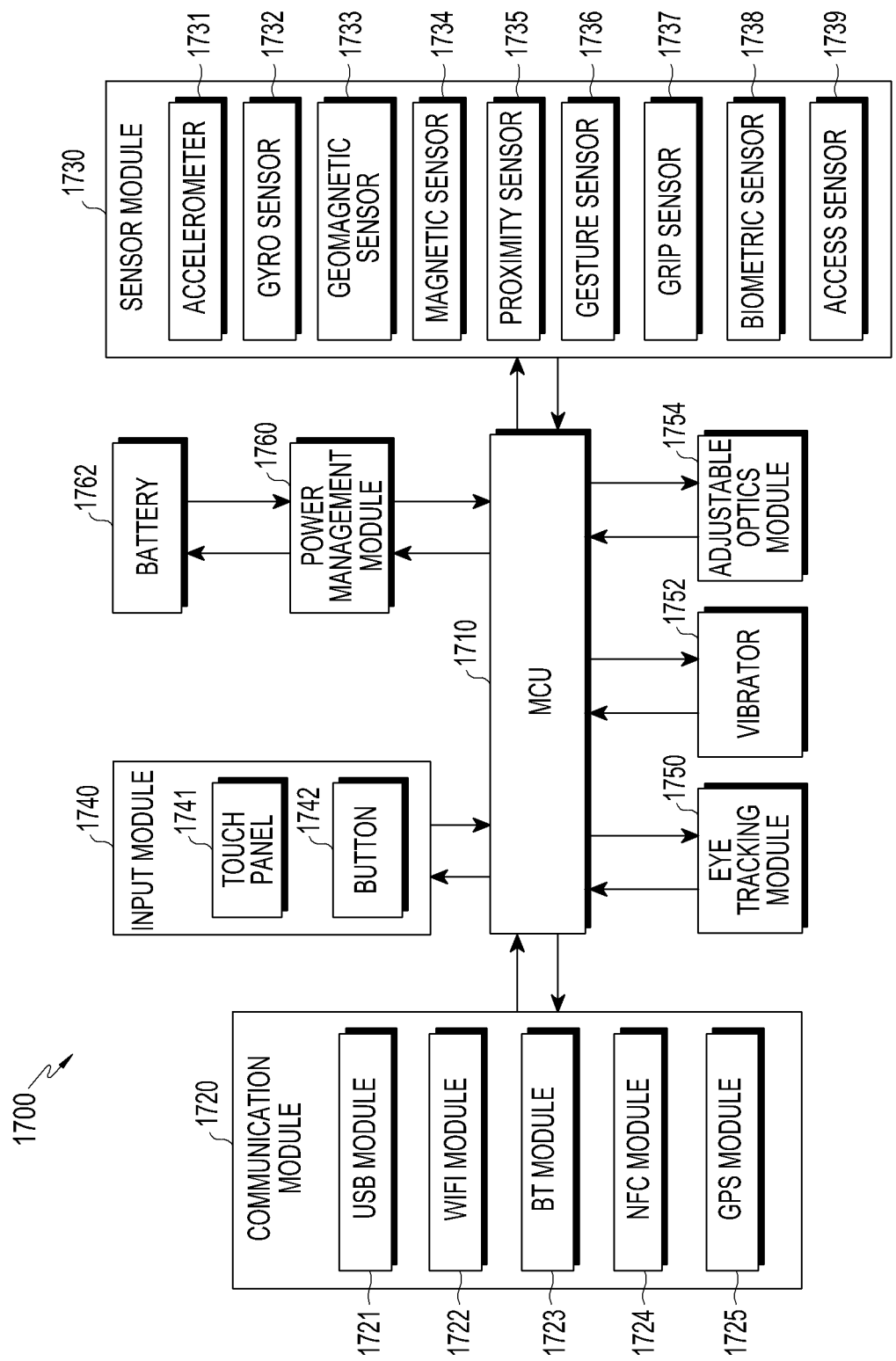
FIG. 17 is a block diagram of an electronic device, according to an embodiment of the present disclosure.

FIG. 17 is a block diagram of an electronic device 1700 according to an embodiment of the present disclosure.

Referring to FIG. 17, the electronic device 1700 may be the VR enabled input unit 325 as illustrated in FIG. 3B and the VR enabled input unit 315 as illustrated in FIG. 13, in one example embodiment. In such example embodiment, the electronic device 1700 is external to a first electronic device and is communicatively coupled to the first electronic device. The electronic device 1700 may include at least one of a micro controller unit (MCU) 1710, a communication module 1720, a sensor module 1730, an input module 1740, an eye tracking module 1750, a vibrator 1752, an adjustable optics module 1754, a power management module 1760, and a battery 1762.

The MCU 1710 may be a controller of the electronic device 1700, for controlling other components (for example, the communication module 1720, the sensor module 1730, the input module 1740, the eye tracking module 1750, the vibrator 1752, the adjustable optics module 1754, and the power management module 1760) by driving an operating system (OS) or an embedded software program. The MCU 1710 may include a processor and a memory.

The communication module 1720 may electrically connect other electronic device (for example, the electronic devices 301 and 1301) to the electronic device 1700 by wired or wireless communication and perform data transmission and reception between the electronic devices. According to an embodiment, the communication module 1720 may include a USB module 1721, a WiFi module 1722, a BT module 1723, an NFC module 1724, and a GPS module 1725. According to an embodiment, at least three of the USB module 1721, the WiFi module 1722, the BT module 1723, the NFC module 1724, and the GPS module 1725 may be included in a single integrated circuit (IC) or IC package.

The sensor module 1730 may measure a physical property or sense an operation state of the electronic device 1700 and convert the measured or sensed information to an electrical signal. The sensor module 1730 may include at least one of, for example, an accelerometer 1731, a gyro sensor 1732, a geomagnetic sensor 1733, a magnetic sensor 1734, a proximity sensor 1735, a gesture sensor 1736, a grip sensor 1737, a biometric sensor 1738, and an access sensor 1739. The electronic device 1700 may sense a head motion of a user wearing the electronic device 1700, using at least one of the accelerometer 1731, the gyro sensor 1732, and the geomagnetic sensor 1733. The electronic device 1700 may sense whether the electronic device 1700 is worn or removed, using the proximity sensor 1735 or the grip sensor 1737. According to an embodiment, the electronic device 1700 may determine whether the user wears the electronic device 1700 by at least one of Infrared (IR) recognition, pressure recognition, and sensing of a capacitance (or dielectric constant) variation involved in wearing of the electronic device 1700. The gesture sensor 1736 may sense a hand or finger motion of the user and receive the hand or finger motion as an input to the electronic device 1700. The electronic device 1700 may sense proximity of an object to the user by the proximity sensor 1735. Alternatively or additionally, the sensor module 1730 may include a biometric sensor such as an e-node sensor, an Electromyography (EMG) sensor, an Electroencephalogram (EEG) sensor, an Electrocardiogram (ECG) sensor, an iris sensor, and a finger print sensor and thus may recognize vital information about the user. The sensor module 1730 may further include a control circuit for controlling at least one of internal sensors.

The input module 1740 may receive an input from the user. The input module 1740 may include a touch pad 1741 and a button 1742. The touch pad 1741 may recognize a touch input in at least one of a capacitive manner, a resistive manner, an IR manner, and an ultrasonic manner. The touch pad 1741 may further include a control circuit. If the touch pad 1741 operates in the capacitive manner, the touch pad 1741 may recognize a physical contact or proximity. The touch pad 1741 may further include a tactile layer. In this case, the touch pad 1741 may provide a tactile response to the user. The button 1742 may be, for example, a physical button, an optical key, or a keypad.

The power management module 1760 may manage power of the electronic device 1700. The power management module 1760 may include, for example, a power management integrated circuit (PMIC), a charger IC, or a battery gauge.

The PMIC may be mounted, for example, on an IC or a system on a chip (SOC) semiconductor. A battery may be charged wiredly or wirelessly. The charger IC may charge the battery and prevent introduction of overvoltage or overcurrent from a charger. According to an embodiment, the charger IC may operate wiredly and/or wirelessly. Wireless charging may be performed, for example, by magnetic resonance, magnetic induction, or electromagnetic waves. A circuit for wireless charging, for example, a coil loop, a resonance circuit, or a rectifier may be added.

The battery fuel gauge may measure, for example, a charge level, a voltage while charging, a current, or temperature of the battery 1762. The battery 1762 may store electricity and supply power. The battery 1762 may include a rechargeable battery or a solar battery.

The eye tracking module 1750 may track the eyes of the user by at least one of an electrical ocular graph (EOG) sensor, a coil system, a dual purkinje system, a bright pupil system, and a dark pupil system. Further, the eye tracking module 1750 may include a micro camera for tracking the eyes.

The adjustable optics module 1754 may measure an inter-pupil distance (IPD) of the user so that the user may view an image suitable for the user's sight. The electronic device 1700 may adjust the distance between lenses according to the IPD of the user measured by the adjustable optics module 1754. The electronic device 1700 may transmit the IPD of the user measured by the adjustable optics module 1754 to the first electronic device to adjust a displayed position of a screen on the display of the first electronic device.

The MCU 1710 may transmit a motion signal sensed through the motion sensor of the sensor module 1730 and transmit the motion signal to the first electronic device. The motion sensor may be at least one of the accelerometer 1731, the gyro sensor 1732, and the geomagnetic sensor 1733.

The MCU 1710 may sense access of an object to the user of the electronic device 1700 through the access sensor 1739 and transmit an access sensing signal to the first electronic device. The MCU 1710 may measure a direction from which the object accesses the user of the second electronic device 1700 through the access sensor 1739 and transmit information indicating the direction to the first electronic device.

The access sensor 1739 may be a space recognition sensor such as an IR sensor, an ultrasonic sensor, a radio frequency (RF) sensor, or a radar. A Wisee sensor or an Allsee sensor may be used as the RF sensor. According to an embodiment, a wireless communication module may be used as the access sensor 1739. The wireless communication module may be at least one of the WiFi module 1722, the BT module 1723, the NFC module 1724, and the GPS module 1725. When an object accesses the second electronic device, the received signal strength of a wireless communication signal received at the wireless communication module may get weak. If the received signal strength quickly decreases by a value larger than a predetermined threshold while the user of the second electronic device is stationary, the MCU 1710 may determine that the object is accessing. In addition, the MCU 1710 may determine a direction in which the received signal strength quickly decreases by the value larger than the predetermined threshold to be a direction from which the object is accessing.

Figure 18:
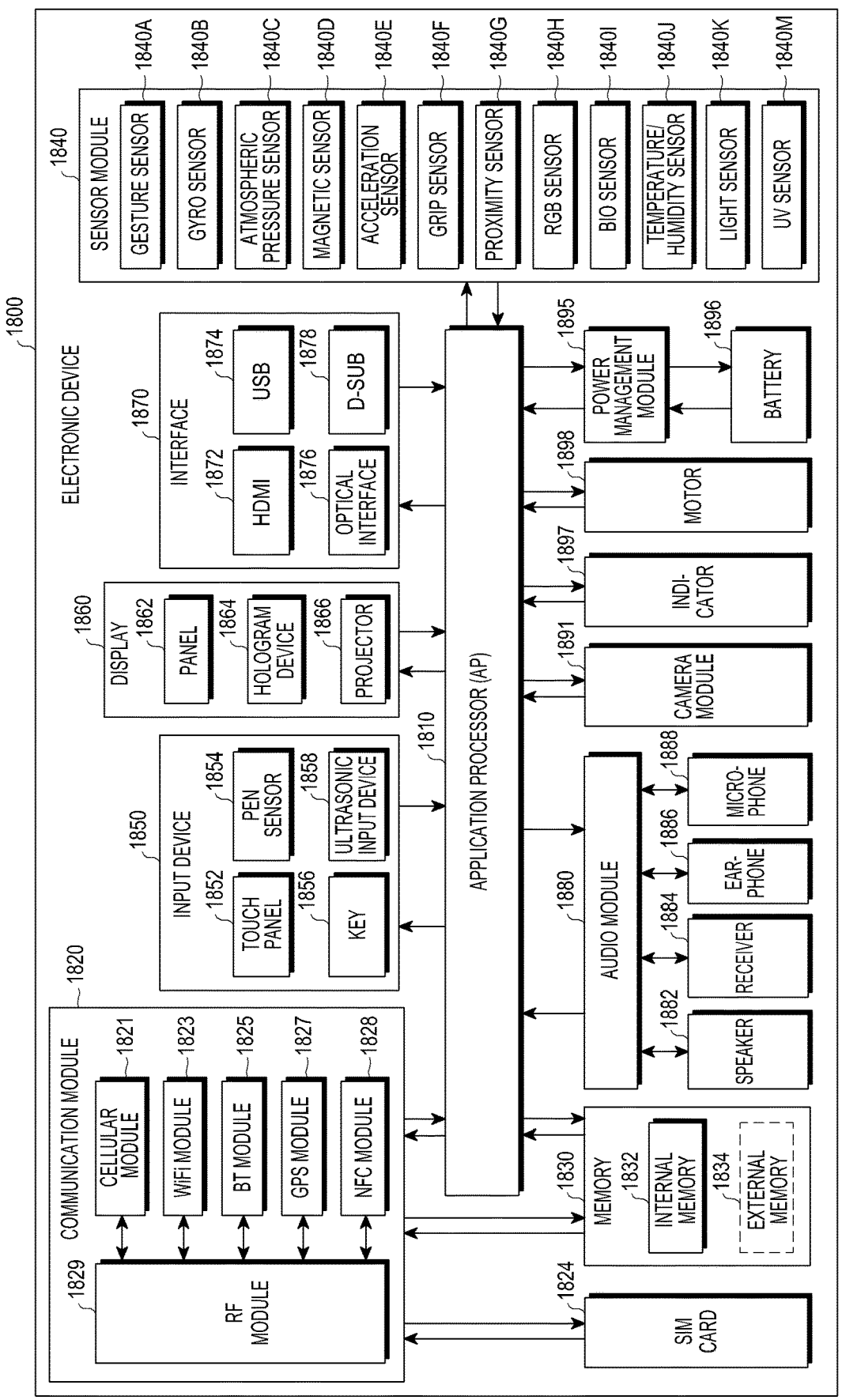
FIG. 18 is a block diagram of an electronic device, according to an embodiment of the present disclosure.

FIG. 18 is a block diagram of an electronic device 1800 according to an embodiment of the disclosure. The electronic device 1800 may be, for example, a whole or a part of the electronic device 301 illustrated in FIGS. 3A and 3B, and the electronic device 1401 illustrated in FIG. 14.

Referring to FIG. 18, the electronic device 1800 may include one or more application processors (APs) 1810, a communication module 1820, a subscriber identification module (SIM) card 1824, a memory 1830, a sensor module 1840, an input device 1850, a display 1860, an interface 1870, an audio module 1880, a camera module 1891, a power management module 1895, a battery 1896, an indicator 1897, and a motor 1898.

The AP 1810 may have a configuration equal or similar to the processor 303 as described above with reference to FIG. 3A. The AP 1810 may control one or more hardware or software components that are connected to the AP 1810 by executing an OS or an application program and may perform processing or computation of various types of data including multimedia data. The AP 1810 may be implemented, for example, as a SoC). According to an embodiment, the AP 1810 may further include a graphics processing unit (GPU). The AP 1810 may also include at least some of the components of the VR management module 308 as illustrated in FIG. 3C.

The communication module 1820 may have a configuration equal or similar to the communication interface 307 as described above with reference to FIG. 3A. The communication module 1820 may transmit and receive data in communication between the electronic device 1800 and other electronic devices. According to an embodiment, the communication module 1820 may include a cellular module 1821, a WiFi module 1823, a BT module 1825, a GPS module 1827, an NFC module 1828, and a RF module 1829.

The cellular module 1821 may provide services such as voice call, video call, SMS, or the Internet, via a communication network (for example, LTE, LTE-A, CDMA, WCDMA, UMTS, WiBro, or GSM). The cellular module 1821 may identify and authenticate electronic devices within a communication network, using a SIM card (for example, the SIM card 1824). According to an embodiment, the cellular module 1821 may perform at least a part of the functionalities of the AP 1810. For example, the cellular module 1821 may perform at least a part of multimedia control functionality.

According to an embodiment, the cellular module 1821 may include a communication processor (CP). The cellular module 1821 may, for example, be implemented as SoC. Although components such as the cellular module 1821 (for example, the CP), the memory 1830, or the power management module 1895 are shown in FIG. 18 as configured separately from the AP 1810, the AP 1810 may include, or be integrated with, one or more of the foregoing components (for example, the cellular module 1821).

According to an embodiment, the AP 1810 or the cellular module 1821 (for example, the CP) may process instructions or data received from at least one of a non-volatile memory or other components by loading the instructions or the data in a volatile memory. In addition, the AP 1810 or the cellular module 1821 may store at the non-volatile memory at least one of data received from at least one of other components or data generated by at least one of the other components.

Each of the WiFi module 1823, the BT module 1825, the GPS module 1827, and the NFC module 1828 may include, for example, a processor that may process data received or transmitted by the respective modules. Although FIG. 18 shows the cellular module 1821, the WiFi module 1823, the BT module 1825, the GPS module 1827, and the NFC module 1828 as separate components, any combination (for example, two or more) of the cellular module 1821, the WiFi module 1823, the BT module 1825, the GPS module 1827, and the NFC module 1828 may be included in an IC or an IC package according to an embodiment. For example, at least some of the processors corresponding to the respective cellular module 1821, the WiFi module 1823, the BT module 1825, the GPS module 1827, or the NFC module 1828 may be implemented as a single SoC. For example, a CP corresponding to the cellular module 1821 and a WiFi processor corresponding to the WiFi module 1823 may be implemented as a single SoC.

The RF module 1829 may transmit and receive data, for example, RF signals. While not shown, the RF module 1829 may include a transceiver, a power amplifier module (PAM), a frequency filter, or a low noise amplifier (LNA). The RF module 1829 may further include one or more components for transmitting and receiving electro-magnetic (EM) waves in free space, such as conductors or conductive wires. Although FIG. 18 shows that the cellular module 1821, the WiFi module 1823, the BT module 1825, the GPS module 1827, and the NFC module 1828 share the single RF module 1829, at least one of the cellular module 1821, the WiFi module 1823, the BT module 1825, the GPS module 1827, or the NFC module 1828 may transmit and receive RF signals via a separate RF module according to an embodiment.

The SIM card 1824 may be a card including a SIM, and may be configured to be inserted into a slot disposed at a specified location of the electronic device. The SIM card 1824 may include a unique identifier (for example, integrated circuit card identifier (ICCID)) or subscriber information (for example, international mobile subscriber identity (IMSI)).

The memory 1830 may include an internal memory 1832 or an external memory 1834. The internal memory 1832 may be at least one of, for example, a volatile memory (for example, dynamic RAM (DRAM), static RAM (SRAM), or synchronous dynamic RAM (SDRAM)) or a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, or NOR flash memory).

According to an embodiment, the internal memory 1832 may be a solid state drive (SSD). The external memory 1834 may be, for example, a flash drive (for example, a compact flash (CF) drive, a secure digital (SD), a micro secure digital (micro-SD), a mini secure digital (mini-SD), an extreme digital (xD), or a memory stick). The external memory 1834 may be operatively coupled to the electronic device 1800 via various interfaces. According to an embodiment, the electronic device 1800 may further include recording devices (or recording media) such as a hard disk drive (HDD).

In one embodiment, the internal memory 1832 may have a configuration equal or similar to the memory 304 as described above with reference to FIG. 3A. In one embodiment, the internal memory 1832 may have a configuration equal or similar to the DR database 326 as described above with reference to FIGS. 3B and 3D. In one embodiment, the internal memory 1832 may have a configuration equal or similar to the SLI database 331 as described above with reference to FIG. 3B. In one embodiment, the internal memory 1832 may have a configuration equal or similar to the GR database 332 as described above with reference to FIGS. 3B and 3D. In one embodiment, the external memory 1834 may have a configuration equal or similar to the DR database 326 as described in above with reference to FIG. 3B. In one embodiment, the external memory 1834 may have a configuration equal or similar to the SLI database 331 as described above with reference to FIG. 3B. In one embodiment, the external memory 1834 may have a configuration equal or similar to the GR database 332 as described above with reference to FIGS. 3B and 3D.

The sensor module 1840 may measure physical properties or detect operational states associated with the electronic device 1800, and convert the measured or detected information into electric signals. The sensor module 1840 may include at least one of, for example, a gesture sensor 1840A, a gyro sensor 1840B, an atmospheric pressure sensor 1840C, a magnetic sensor 1840D, an accelerometer sensor 1840E, a grip sensor 1840F, a proximity sensor 1840G, a color sensor 1840H (for example, a red, green, blue (RGB) sensor), a biometric sensor 1840I, a temperature/humidity sensor 1840J, an illuminance sensor 1840K, or an ultra violet (UV) light sensor 1840M. Additionally or alternatively, the sensor module 1840 may include, for example, an electrical-nose sensor, an EMG sensor, an EEG sensor, an IR sensor, an iris sensor, or a finger print sensor. The sensor module 1840 may further include a control circuit for controlling one or more sensors included therein.

The input device 1850 may include a touch panel 1852, a (digital) pen sensor 1854, a key 1856, or an ultrasonic input device 1858. The touch panel 1852 may detect a touch input using at least one of, for example, capacitive, resistive, infrared, and ultrasonic methods. The touch panel 1852 may further include a control circuit. A capacitive-type touch panel may detect physical touch inputs or proximity inputs. The touch panel 1852 may further include a tactile layer, which may provide haptic feedback to the user.

The (digital) pen sensor 1854 may be implemented, for example, using methods identical to or similar to receiving a touch input from a user, or using a separate detection sheet. The key 1856 may include, for example, a physical button, an optical key, or a keypad. The ultrasonic input device 1858 may be a device configured to identify data by detecting, using a microphone (for example, a microphone 1888), ultrasonic signals generated by a device capable of generating the ultrasonic signal. The ultrasonic input device 1858 may detect data wirelessly. According to an embodiment, the electronic device 1800 may receive a user input from an external device (for example, a computer or a server) connected to the electronic device 1800 using the communication module 1820. The input device 1850 may further have a configuration equal or similar to the VR enabled input unit 325 as described above with reference to FIG. 3B.

The display module 1860 may include a panel 1862, a hologram device 1864, or a projector 1866. The panel 1862 may be, for example, a LCD or an active-matrix organic light-emitting diode (AM-OLED) display. The panel 1862 may be configured to be, for example, flexible, transparent, or wearable. The panel 1862 and the touch panel 1852 may be implemented as a single module. The hologram device 1864 may utilize the interference of light waves to provide a three-dimensional image in empty space. The projector 1866 may provide an image by projecting light on a display. The display may be positioned, for example, inside or outside the electronic device 1800. According to an embodiment, the display module 1860 may further include a control circuit for controlling the panel 1862, the hologram device 1864, or the projector 1866. The display module 1860 may further have a configuration equal or similar to the VR enabled display unit 306 as described in FIG. 3a.

The interface 1870 may include, for example, a high-definition multimedia interface (HDMI) 1872, a USB 1874, an optical interface 1876, or a D-sub connector 1878. Additionally or alternatively, the interface 1870 may include, for example, a mobile high-definition link (MHL) interface, an SD/MMC, or an Infrared Data Association (IrDA) interface. The interface 1870 may be incorporated into, for example, the communication interface 307 as described above with reference to FIG. 3A.

The audio module 1880 may encode/decode a voice into an electrical signal, and vice versa. At least a part of components of the audio module 1880 may be incorporated in, for example, the I/O interface 305 as described above with reference to FIG. 3A. The audio module 1880 may process audio information input into, or output from, for example, a speaker 1882, a receiver 1884, an earphone 1886, or the microphone 1888.

The camera module 1891 may capture still images or a video. According to an embodiment, the camera module 1891 may include one or more image sensors (for example, a front sensor or a rear sensor), a lens, an image signal processor (ISP), or a flash (for example, a LED or a Xenon lamp).

The power management module 1895 may manage power of the electronic device 1800. The power management module 1895 may include, for example, a PMIC, a charger IC, or a battery gauge.

The PMIC may be disposed, for example, in an IC or a SoC semiconductor. The charging method for the electronic device 1800 may include wired or wireless charging. The charger IC may charge a battery, or prevent excessive voltage or excessive current from a charger from entering the electronic device 1800. According to an embodiment, the charger IC may include at least one of a wired charger IC or a wireless charger IC. The wireless charger IC may be, for example, a magnetic resonance type, a magnetic induction type or an electromagnetic wave type, and may include additional circuits for wireless charging, such as a coil loop, a resonance circuit, or a rectifier.

The battery gauge may measure, for example, a charge level, a voltage while charging, current, or temperature of the battery 1896. The battery 1896 may store or generate electricity and supply power to the electronic device 1800 using the stored or generated electricity. The battery 1896 may include, for example, a rechargeable battery or a solar battery.

The indicator 1897 may indicate one or more states (for example, boot status, message status, or charge status) of the electronic device 1800 or a part of the electronic device 1800 (for example, the AP 1810). The motor 1898 may convert an electrical signal into a mechanical vibration. The electronic device 1800 may include a device for supporting mobile TV (for example, a GPU). The device for supporting mobile TV may process media data compliant with, for example, digital multimedia broadcasting (DMB), digital video broadcasting (DVB), or Media Flow.

Each of components of an electronic device described above according to the present disclosure may include one or more components, and each component's name may vary according to the type of the electronic device. The electronic device according to the present disclosure may include at least one of the above-described components, and some may be omitted or additional components may be included. In addition, some of the components of the hardware according to the present disclosure may be combined into a single component and perform functions identical to those of the respective components before their combination. Similarly, some of the components of the hardware according to the present disclosure may be split into a plurality of entities that collectively perform functions identical to those of the respective component before their split.

The term "module" as used herein may include its ordinary meaning including, but not limited to, for example, a unit of one, or a combination of two or more, hardware, software or firmware. The term "module" may be used interchangeably with a term such as unit, logic, logical block, component, or circuit. A module may be the smallest unit for performing one or more functions, or a portion thereof. A module may be implemented mechanically or electronically. For example, a module according to the present disclosure may include at least one of a known or to-be-developed application-specific integrated circuit (ASIC), field-programmable gate array (FPGA) or programmable logic device that perform certain operations.

According to various embodiments, at least a part of devices (for example, modules or their functions) or methods (for example, operations) according to the present disclosure may be implemented, for example, in the form of a programming module, as commands stored in a non-transitory computer-readable storage medium. When a command is executed by one or more processors (for example, the processor 303), the one or more processors may execute a function corresponding to the command. The non-transitory computer-readable storage medium may be, for example, the memory 304. At least a part of the programming module may be implemented (for example, executed) by the processor 303. At least a part of the programming module may include, for example, a module, a program, a routine, a set of instructions, and/or a process to execute one or more functions.

The non-transitory computer-readable recording medium may include any kind of hardware device configured specially to store a program command (for example, a programming module). Examples of the hardware device may include magnetic media such as a hard disk, floppy disk, and a magnetic tape, optical media such as a compact disc read only memory (CD-ROM) and a digital versatile disc (DVD), magneto-optical media such as a optical disk, a ROM, a RAM, a flash memory, and the like. The program command may include a premium language code that may be executed in a computer using an interpreter as well as a mechanical code produced by a compiler. The above-mentioned hardware device may be implemented as one or more software modules to perform the operations of the present disclosure and vice versa.

While certain embodiments of the present disclosure have been illustrated and described herein, the present disclosure is not intended to be limited thereto. The present disclosure may be otherwise variously embodied, and practiced within the scope of the present disclosure as defined by the appended claims and their equivalents.

What is claimed is:
1. A method for controlling at least one device in a wireless communication system, the method comprising:
    obtaining status information of devices in an image of a real world environment, wherein the status information includes first information obtained from a first device that is connectable from among the devices and second information indicating that a second device from among the devices is not connectable, the status information includes information corresponding to at least one device identifier and at least one device parameter of the at least one of the devices, and the at least one device parameter includes an operational status, an operational mode, a battery status, type of network connection, availability of the network connection, a connection with one or more further devices, and status of the network connection with one or more further devices;
    displaying a first representation of the real world environment on a display, wherein the first representation includes a graphical representation of the devices based on the status information of the devices;
    receiving a user-input indicating control information of at least one of the devices based on the graphical representation of the devices;
    controlling one or more operations of the at least one of the devices in the real world environment based on the control information;
    identifying whether a variation of the status information according to the one or more operations of the at least one of the devices exceeds a predetermined threshold; and
    representing an audio indicator corresponding to the variation in response to the amount of the variation of the status information exceeding the predetermined threshold,
    wherein representing the audio indicator comprises;
    obtaining the audio indicator from a graphical representation database over a network;
    detecting an audio output device located in proximity to a device of which the amount the variation of the status information exceeds the predetermined threshold, based on location information of the device, and
    controlling the detected audio output device to play the audio indicator.

2. The method of claim 1, wherein displaying the first representation of the real world environment comprises:
    obtaining the first representation of the real world environment;
    identifying the devices from the first representation;
    obtaining at least one of the status information and location information of the devices; and
    generating a modified first representation of the real world environment, wherein the modified first representation includes the graphical representation of the devices based on the at least one of the status information and the location information, and
    wherein the first representation of the real world environment indicates a virtual realty environment corresponding to the real world environment.

3. The method of claim 1, wherein the first representation includes one of a direct representation of the real world environment and a processed representation of the real world environment.

4. The method of claim 1, wherein the control information indicates a variation in a value of one or more location information of the at least one of the devices, and the at least one device parameter of the at least one of the devices.

5. The method of claim 1, wherein obtaining the status information comprises one of:
    obtaining the status information from the first device periodically;
    obtaining the status information from the first device in real time;
    obtaining the status information from the first device when a value of the at least one device parameter changes;
    obtaining the status information from the first device when a value of the at least one device parameter exceeds a predetermined threshold level;
    obtaining the status information via an intermediary device when a value of the at least one device parameter changes; and
    obtaining the status information via the intermediary device when a value of the at least one device parameter exceeds a predetermined threshold level.

6. The method of claim 2, wherein obtaining the location information comprises one or more of:
    obtaining real-time location from the devices;
    obtaining real-time location of the devices from at least one positioning system;

obtaining real-time location of the devices from a master device; and obtaining real-time location of the devices from an intermediary device.

7. The method of claim 2, wherein generating the modified first representation comprises:

mapping a real-time location on the first representation based on the location information; and superimposing the graphical representation of the at least one of the devices and the status information on the first representation at the mapped real-time location.

8. The method of claim 2, wherein the devices are identified based on one or more of a user-input indicative of labelling the devices on the first representation, metadata associated with the first representation, processing of content within the first representation, location information of a device capturing the first representation of the real world environment, and location information of one or more devices available in proximity to the location information of the devices.

9. The method of claim 2, further comprising:

displaying the modified first representation on a virtual realty enabled display.

10. The method of claim 3, further comprising:

determining a variation in at least one of the status information and location information of the devices; and generating a further modified first representation of the real world environment, wherein the modified first representation includes the graphical representation of the devices in conjunction with the determined variation.

11. The method of claim 1, wherein receiving the user-input comprises one of:

receiving a first user-input, through a user interface, indicative of selection of the at least one of the devices;

fetching a graphical representation of a control panel associated with the at least one of the devices from a database; and displaying a current view of the first representation on the display to include the graphical representation of the control panel;

receiving a second user-input, through the user interface, indicative of manipulating the graphical representation of the control panel;

determining the control information based on the manipulation; and rendering the current view of the first representation to include the control information.

12. The method of claim 1, wherein the controlling is configured to:

transmit the control information to the at least one of the devices in the real world environment;

obtain a further status information from the at least one of the devices based on the control information;

fetch a graphical representation associated with the further status information from a database; and modify and display the first representation to include the graphical representation of the further status information and the control information, wherein modifying and displaying the first representation comprise:

modifying a current view of the first representation to include the further status information and the control information and displaying the modified view of the first representation on the display.

13. A device for controlling at least one device in a wireless communication system, comprising:

a user interface configured to receive a user-input indicating control information of at least one of devices based on a graphical representation of the at least one of the devices; and at least one processor configured to:

obtain status information of the devices in an image of a real world environment, wherein the status information includes first information obtained from a first device connectable from among the devices and second information indicating that a second device from among the devices is not connectable, the status information includes information corresponding to at least one device identifier and at least one device parameter of the at least one of the devices, and the at least one device parameter includes an operational status, an operation mode, a battery status, type of network connection, availability of the network connection, a connection with one or more further devices, and status of the network connection with one or more further devices, display a first representation of the real world environment on a display, the first representation including a graphical representation of the devices based on the status information of the devices, control one or more operations of the at least one of the devices in the real world environment based on the control information, identify whether a variation of the status information according to the one or more operations of the at least one of the devices exceeds a predetermined threshold, and represent an audio indicator corresponding to the variation in response to the amount of the variation of the status information exceeding a predetermined threshold, wherein to represent to the audio indicator, the at least one processor is configured to:

obtain the audio indicator from a graphical representation database over a network;

detect an audio output device located in proximity to a device of which the amount the variation of the status information exceeds the predetermined threshold, based on location information of the device; and control the detected audio output device to play the audio indicator.

14. The device of claim 13, wherein the at least one processor is further configured to:

obtain the first representation of the real world environment, identify the devices from the first representation, obtain at least one of the status information and location information of the devices, and create a modified first representation of the real world environment, the modified first representation including the graphical representation of the devices based on the at least one of the status information and the location information, wherein the first representation of the real world environment is indicative of a virtual realty environment corresponding to the real world environment.

15. The device of claim 14, wherein the at least one processor is further configured to perform one of capture the first representation of the real world environment in real time, and fetch the first representation from a database.

16. The device of claim 14, wherein the at least one processor, for generating the modified first representation, is further configured to:
- map a real-time location on the first representation based on the location information, and
- superimpose the graphical representation of the devices and the status information on the first representation at the mapped real-time location.

17. The device of claim 14, wherein the at least one processor is further configured to:
- determine a variation in the at least one of the status information and the location information of the devices, and
- generate a further modified first representation of the real world environment, and
- wherein the modified first representation includes the graphical representation of the devices in conjunction with the determined variation.

18. The device of claim 13, wherein the at least one processor is further configured to transmit the control information to the at least one of the devices in the real world environment, and
- wherein the control information indicates a variation in a value of one or more location information of the at least one of the devices, and at least one device parameter of the at least one of the devices.

19. The device of claim 18, wherein the at least one processor is further configured to:
- obtain at least one further status information and a real-time location of the at least one of the devices based on the control information, and
- modify the first representation to include the control information and the at least one further status information and real-time location.

20. The device of claim 19, wherein the at least one processor is further configured to display the modified first representation on the display.

* * * * *